(12) United States Patent
Roark

(10) Patent No.: US 7,329,359 B2
(45) Date of Patent: Feb. 12, 2008

(54) APPLICATION OF CATALYSTS FOR DESTRUCTION OF ORGANIC COMPOUNDS IN LIQUID MEDIA

(75) Inventor: Shane E Roark, Boulder, CO (US)

(73) Assignee: Eltron Research, Inc., Boulder, CO (US)

( * ) Notice: Subject to any disclaimer, the term of this patent is extended or adjusted under 35 U.S.C. 154(b) by 129 days.

(21) Appl. No.: 10/256,212

(22) Filed: Sep. 25, 2002

(65) Prior Publication Data

US 2003/0166987 A1     Sep. 4, 2003

Related U.S. Application Data

(63) Continuation-in-part of application No. 09/468,034, filed on Dec. 20, 1999, now Pat. No. 6,458,741.

(51) Int. Cl.
    *C02F 1/72* (2006.01)

(52) U.S. Cl. ............... 210/763; 210/762; 502/304; 502/324; 502/330; 502/331

(58) Field of Classification Search ........... 210/762, 210/763; 502/303, 304, 308, 324, 326, 330, 502/331, 344, 345, 349, 350
See application file for complete search history.

(56) References Cited

U.S. PATENT DOCUMENTS 3,885,020 A    5/1975  Whelan ................ 423/245
4,604,215 A *  8/1986  McCorquodale ........ 210/762
4,661,329 A    4/1987  Suzuki et al. ........... 423/245

(Continued)

FOREIGN PATENT DOCUMENTS

EP         0514177         9/1998

(Continued)

OTHER PUBLICATIONS

Imamura et al., Oxidation of Tristearin on Manganese/Cerium Composite Oxide, Ind. Eng. Chem. Res., vol. 28, No. 10 1989, p. 1452-56.*

(Continued)

*Primary Examiner*—Peter A. Hruskoci
(74) *Attorney, Agent, or Firm*—Greenlee, Winner and Sullivan, P.C.

(57) ABSTRACT

A method of destroying an organic compound in liquid media comprising: contacting said liquid media with a catalyst of formula: $nN/Ce_{1-x}Zr_cB_bB'_{b'}B''_{b''}O_{2-\delta}$ wherein n is a percentage from 0 to 25; N is one or more metals selected from the group consisting of Pt, Pd, Rh, Ru, Re, Os and Ir; $x=b+b'+b''+c$; b, b', and b'' are each, independently of one another, 0 to 0.99; $x \leq 0.7$; B, B' and B'' are independently selected from the group consisting of Ti, V, Mn, Fe, Co, Cr, Ni, Au, Ag and Cu; c is between 0 and 0.2; $\delta$ is a number which renders the catalyst charge neutral; provided that at least one of b, b' and b'' is nonzero; provided that when B is Mn, b' or c or n is nonzero at a temperature and pressure sufficient to destroy an organic compound is provided. Also provided are catalyst compositions for destroying at least one organic compound in liquid media comprising a catalyst and a support.

17 Claims, 25 Drawing Sheets

U.S. PATENT DOCUMENTS

| | | | | |
|---|---|---|---|---|
| 4,751,005 A | * | 6/1988 | Mitsui et al. | 210/759 |
| 4,968,656 A | | 11/1990 | Fukuda et al. | 502/244 |
| 4,970,005 A | * | 11/1990 | Schuchardt | 210/759 |
| 5,061,464 A | | 10/1991 | Cordonna, Jr. et al. | 423/213.5 |
| 5,145,587 A | * | 9/1992 | Ishii et al. | 210/759 |
| 5,190,668 A | * | 3/1993 | Chuang | 210/750 |
| 5,283,041 A | | 2/1994 | Nguyen et al. | 423/240 |
| 5,374,599 A | | 12/1994 | Ishii et al. | 502/326 |
| 5,384,301 A | | 1/1995 | Flytzani-Stephanopoulos et al. | 502/304 |
| 5,399,541 A | | 3/1995 | Ishii et al. | 502/326 |
| 5,491,120 A | | 2/1996 | Voss et al. | 502/304 |
| 5,500,198 A | * | 3/1996 | Liu et al. | 423/437.1 |
| 5,620,610 A | | 4/1997 | Ishii et al. | 210/763 |
| 5,627,124 A | | 5/1997 | Farrauto et al. | 502/304 |
| 5,843,195 A | | 12/1998 | Aoyama | 48/127.7 |
| 5,851,948 A | | 12/1998 | Chuang et al. | 502/314 |
| 5,882,616 A | | 3/1999 | Ziebarth et al. | 423/245.3 |
| 5,925,590 A | | 7/1999 | White et al. | 502/302 |
| 6,419,837 B1 | * | 7/2002 | Akse | 210/752 |
| 6,458,741 B1 | * | 10/2002 | Roark et al. | 502/303 |
| 6,787,118 B2 | | 9/2004 | Roark et al. | |

FOREIGN PATENT DOCUMENTS

JP 4100595 A2 4/1992

OTHER PUBLICATIONS

Barresi, A.A. and Baldi, B. (1994), "Deep Catalytic Oxidation of Aromatic Hydrocarbon Mixtures: Reciprocal Inhibition Effects and Kinetics," *Ind. Eng. Chem.* 33:2964-2974.

Bernal, S. et al.(Apr. 1999), "Some Recent Results on Metal/ Support Interaction Effects in NM/CeO$_2$ (NM: Noble Metal) Catalysts," *Catal. Today* 50:175-206.

Gangwal, S.K. et al. (1998), "Kinetics and Selectivity of Deep Catalytic Oxidation of n-Hexane and Benzene," *Appl. Catal.* 36:231-247.

Chuang, K.T. et al. (1992), "Removal and Destruction of Benzene, Toluene, and Xylene from Wastewater by Air Stripping and Catalytic Oxidation," *Ind. Eng. Chem. Res.* 31:2466-2472.

Chuang, K.T. et al. (1994), "Kinetics and Mechanism of Catalytic Oxidation of Formaldehyde over Hydrophobic Catalysts," *Ind. Eng. Chem. Res.* 33:1680-1686.

Haruta, M. et al. (1993), "Low-Temperature Oxidation of CO over Gold Supported on TiO$_2$, a-Fe$_2$O$_3$, and Co$_3$O$_4$," *J. Catal.* 144:175-192.

Hocevar, S. et al. (Nov. 2000), "CWO of phenol on two differently prepared CuO-CeO$_2$ catalysts," *Appl. Catal. B* 28:113-125.

Imamura, S. et al. (1988), "Wet Oxidation Catalyzed by Ruthenium Supported on Cerium (IV) Oxides," *Ind. Eng. Chem. Res.* 27:718-721.

Kundakovic, Lj. and Flytzani-Stephanopoulos, M. (Oct. 1998), "Cu- and Ag-Modified Cerium Oxide Catalysts for Methane Oxidation," *J. Catal.* 179:203-221.

Leitenburg, C. et al. (1996), "Wet Oxidation of Acetic Acid Catalyzed by Doped Ceria," *Appl. Catal. B: Environmental* 11:L29-L35.

Liu, W. and Flytzani-Stephanopoulos, M. (1995), "Total Oxidation of Carbon Monoxide and Methane over Transition Metal-Fluorite Oxide Composite Catalyst: I. Catalyst Composition and Activity," *J. Catal.* 153:304-316.

Luck, F. (Oct. 1999), "Wet air oxidation: past, present and future," *Catalysis Today* 53:81-91.

Liu, W. and Flytzani-Stephanopoulos, M. (1995), "Total Oxidation of Carbon Monoxide and Methane over Transition Metal-Fluorite Oxide Composite Catalyst: II. Catalyst Characterization and Reaction Kinetics," *J. Catal.* 153:317-332.

Logan, A.D. and Shelef, M. (1994), "Oxygen availability in mixed cerium/praseodymium oxides and the effect of noble metals," J. Mater. Res. 9(2):468-475.

Mishra, V.S. et al. (1995), "Wet Air Oxidation," *Ind. Eng. Chem. Res.* 34:2-48.

Perego, C. and Villa, P. (1997), "Catalyst Preparation Methods," *Catal. Today* 34:281-305.

Rangwala, H.A. et al. (1994), "Preparation, Characterization and Activity o Wet-Proofed Pt/Silicalite Catalysts," Can J. Chem. Eng. 72:296-303.

Sharma, R.K. et al. (1995), "Catalytic Destruction of Volatile Organic Compounds Using Supported Platinum and Palladium Hydrophobic Catalysts," *Ind. Eng. Chem. Res.* 34:4310-4317.

Spivey, J.J. (1987), "Complete Catalytic Oxidation of Volatile Organics," *Ind. Eng. Chem. Res.* 26:2165-2180.

Terribile, D. et al. (Jan. 1999), "Catalytic Combustion of Hydrocarbons with Mn and Cu-doped Ceria-zirconia Solid Solutions," *Catal. Today* 47:133-140.

Trovarelli, A. (1996), "Catalytic Properties of Ceria and CeO$_2$-Containing Materials," *Catal. Rev. Sci. Eng.* 38(4):439-520.

Trovarelli, A et al. (Apr. 1999), "The Utilization of Ceria in Industrial Catalysis," *Catal. Today* 50:353-367.

Tschope, A. et al. (1995), "Redox Activity of Nonstoichoimetric Cerium Oxide-Based Nanocrystalline Catalysts," J. Catal. 157:42-50.

Wu, J. C-S. and Chang, T-Y. (Sep. 1998), "VOC deep oxidation over Pt catalysts using hydrophobic supports," Catal. Today 44:111-118.

Zhang, M. et al. (1997), "Catalytic deep oxidation of volatile organic compounds over fluorinated carbon supported platinum catalysts at low temperatures," *Appl. Catal. B* 13:123-130.

Zhang, Q. and Chuang, K.T. (Aug. 1998), "Alumina-Supported Noble Metal Catalysts for Destructive Oxidation of Organic Pollutants in Effluent from a Softwoo Kraft Pulp Mill," *Ind. Eng. Chem. Res.* 37:3343-3349.

Zhang, Q. and Chuang, K.T. (Apr. 1999), "Wet Oxidatino of Bleach Plant Effluent: Effects of pH on the Oxidation with or without a Pd/Al$_2$O$_3$ Catalyst," Can. J. Chem. Eng. 77:399-405.

Zhang, Q. and Chuang, K.T. (Aug. 1998), "Kinetics of wet oxidation of black liquid over a Pt-Pd-Ce/alumina catalyst," *Appl. Catal. B* 17:321-332.

Luo, M-F. et al. (1997), "TPR and TPD studies of CuO/CeO$_2$ catalysts for low temperature CO oxidation," Appl. Catal. A: General 162:121-131.

* cited by examiner

APPLICATION OF CATALYSTS FOR DESTRUCTION OF ORGANIC COMPOUNDS IN LIQUID MEDIA

CROSS-REFERENCE TO RELATED APPLICATIONS

This application is a continuation-in-part of U.S. patent application Ser. No. 09/468,034, filed Dec. 20, 1999, now U.S. Pat. No. 6,458,741. issued Oct. 1, 2002, which application is hereby incorporated by reference to the extent not inconsistent with the disclosure herein.

STATEMENT REGARDING FEDERALLY SPONSORED RESEARCH OR DEVELOPMENT

This invention was made with United States Government support under Contract Number 68-D-02-019, awarded by the Environmental Protection Agency. The United States Government has certain rights in the invention.

BACKGROUND OF THE INVENTION

This invention relates generally to catalysts for purification of liquid media.

Contamination of liquids, including water, with organic compounds is of great concern. Organic compounds contaminate liquids by various methods, including accidental discharge of organic compounds into water streams, leaks in vessels transporting organic compounds such as oil, and other ways. Water contaminated with organic compounds has direct and secondary effects on health and the environment.

Numerous processes have been developed for the purification of wastewater. Wet air oxidation (WAO) systems employ relatively severe operating temperatures (up to 350° C.) and high pressures (up to about 20 MPa) to decompose high concentrations of organic materials. In a typical WAO system, waste is pumped through a heat exchanger into a reactor along with compressed air. The oxidized content of the reactor is passed to a separator that partitions the gas and liquid fractions. The high temperature and pressure in the reactor maintains water in the liquid state and increases the solubility of oxygen supplied by the compressed air. These conditions result in a highly oxidizing environment that can be used to decontaminate a wide variety of industrial waste streams, such as those generated from pulp and paper mills, breweries, and chemical processing plants. One of the major uses of WAO is for treatment of sewage sludge, where the sludge is either completely oxidized or rendered suitable for disposal or biological treatment.

Through the use of appropriate catalysts in WAO systems, the severity of the processing conditions can be reduced to improve the economics of the operation. Moreover, non-catalyzed WAO produces lower molecular weight compounds as major byproducts of incomplete oxidation (Mishra, V. S. et al., Ind. Eng. Chem. Res. (1995) 32, 2; Leitenburg, et al., Appl. Catal. B: Environ. (1996) 11, L29-L35; Luck, F. Catal. Today (1999) 53, 81-91). These lower molecular weight compounds typically are carboxylic acids, alcohols, and aldehydes that are resistant to decomposition and can dictate the kinetics and resulting cost of the process. However, catalytic wet-air oxidation (CWAO) leads to complete oxidation of organic material to $CO_2$ and $H_2O$, thereby minimizing post-treatment processing of the contaminated water.

Both homogeneous and heterogeneous catalysts have been applied to WAO with some success; however, homogeneous catalysts are less desirable because they are difficult to remove from the treated effluent, which adds process steps and expense. Binary and ternary heterogenous catalysts based on Co/Bi, Cu/Co, Cu/Co/Bi, Ru/Ce, Mn/Ce (1:1), and Ru/Mn/Ce have been tested for acetic acid destruction with varying degrees of success (Mishra, V. S., et al. Ind. Eng. Chem. Res. (1995) 34, 2-48).

Imamura et al. compared the activity of 5% Pt, Ru, or Rh supported on $CeO_2$ for destruction of poly(ethylene glycol) at 473 K and reported that $Ru/CeO_2$ was most active (Imamura, et al. Ind. Eng. Chem. Res. (1988) 27, 718).

de Leitenburg et al tested $CeO_2$, 80% $CeO_2$-20% $ZrO_2$, 76% $CeO_2$-19% $ZrO_2$-5% CuO, 76% $CeO_2$-19% $ZrO_2$-5% $MnO_2$, and 5% CuO on $Al_2O_3$ for the destruction of 2000 ppm acetic acid in water at 190° C. and 3 MPa. de Leitenburg et al reported a 14% destruction of 2000 ppm acetic acid using undoped $CeO_2$ and up to 96% destruction of 2000 ppm acetic acid using 76% $CeO_2$-19% $ZrO_2$-5% $MnO_2$ (de Leitenburg, et al., Appl. Catal B: Environ. (1996) 11, L29-L39).

Zhang and Chuang studied the effect of adding 4 wt. % Ce to 1 wt. % Pt or Pd supported on $Al_2O_3$ for oxidation of water from paper and pulp mills at 433-463K and pressures of 1.5 to 2.2 MPa and reported that 50% TOC reduction can be achieved at about an hour at 1.5 MPa and 463K (Zhang, Q. and Chuang, K. T. Applied Catalysis B: Environmental (1998) 17, 321-332).

Hocevar et al. studied the effect of catalyst preparation on phenol destruction at 432K and 7.3 bar oxygen partial pressure (total pressure in the reactor 12.1 bar) using $Ce_{1-x}Cu_xO_{2-\delta}$ catalysts, where $0.07<x<0.27$ and reported samples prepared by sol-gel techniques were more active than samples prepared by co-precipitation (Hocevar, S. et al., Applied Catalysis B: Environmental (2000) 28, 113-125).

European Patent EP0514177 (Ishii) describes the use of catalysts having one component which is 90-99.95% by weight which contains 4.95 to 95 wt. % iron oxide along with the balance at least one of titanium, silicon and zirconium; and another component which is 0.05 to 10% by weight cobalt, nickel, cerium, silver, gold, platinum, palladium, rhodium, ruthenium and iridium to treat wastewater.

Mitsui describes a catalyst containing zirconium oxide (5-98 wt. %), a lanthanum oxide (2-95 wt. %) and at least one of manganese, iron, cobalt, nickel, tungsten, copper, silver, gold, platinum, palladium, rhodium, ruthenium and iridium (0.05-25 wt. %) for treating wastewater at temperatures less than or equal to 370° C. (JP4100595A2).

There is a need in the art for improved catalysts and catalytic methods for removing organic compounds from liquid media.

BRIEF SUMMARY OF THE INVENTION

Provided are methods for destroying organic compounds in liquid media comprising contacting said liquid media with a catalyst comprising: at least one of cerium and zirconium with at least one member of the group consisting of: Gd, La, Sc, Cr, Ti, V, Mn, Fe, Co, Ni, Au, Ag, Cu Pt, Pd, Rh, Ru, Re, Os and Ir at a temperature and pressure sufficient to destroy at least one organic compound.

More particularly, the catalyst useful in the methods comprise one or more first metals selected from the group consisting of: Ce and Zr; and at least one of ((a) (b) or (c)) where (a) is one or more second metals selected from the group consisting of: Gd, La, Sr and Sc; (b) is one or more third metals selected from the group consisting of: Ti, V, Mn, Fe, Co, Cr, Ni, Au, Ag and Cu; and (c) is one or more fourth metals selected from the group consisting of Pt, Pd, Rh, Ru, Re, Os and Ir. Preferably the second metals are one or more of Gd, Sr and La. Preferably the third metals are one or more of Mn, Fe, Co, Cr and Cu. The second and third metals together preferably comprise more than about 30% of said catalyst. Preferably the fourth metals are Pt, Pd and mixtures thereof, with Pt being more preferred than Pd. The catalysts preferably comprise less than about 25% of fourth metals, and more preferably comprise less than about 5% of fourth metals, and most preferably comprise less than about 2% of fourth metals. Preferably, the catalyst comprises 70% or less cerium.

One class of catalysts useful in the invention has one member from the group of second and third metals combined. Another class of catalysts of the invention has one member from the group of second metals and one member from the group of third metals. Another class of catalysts of the invention has more than one member from the group of second metals. Another class of catalysts of the invention has more than one member from the group of third metals. Another class of catalysts of the invention has more than one member from the group of second and third metals combined. Each of the above classes may optionally contain one or more members of the group of fourth metals.

Another class of catalysts useful in the invention are those having formula (I):

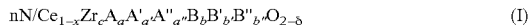  (I)

wherein n is a percentage from 0 to 25; N is one or more metals selected from the group consisting of Pt, Pd, Rh, Ru, Re, Os and Ir; x=a+a'+a"+b+b'+b"+c; a, a', a", b, b', b" and c are each, independently of one another, 0 to 0.99; δ is a number which renders the catalyst charge neutral; A, A' and A" are independently selected from the group consisting of Gd, La, Sr and Sc; B, B' and B" are independently selected from the group consisting of Ti, V, Mn, Fe, Co, Cr, Ni, Au, Ag and Cu; provided that at least one of a, a', a", b, b', b" or c is nonzero. In this class of compounds, preferably, N is selected from the group consisting of Pt and Pd. Preferably, n is a percentage from 0 to 10, more preferably, n is a percentage from 0 to 5, and most preferably, n is a percentage from 0 to 3. In this class of compounds, preferably A, A' and A" are selected from the group consisting of Gd, La and Sr. In this class of compounds, preferably B, B' and B" are selected from the group consisting of Mn, Cu, Fe, Co and Cr. Preferably, c is between 0 to 0.2. Preferably, a+a'+a" is between 0 and 0.1. Preferably b+b'+b" is between 0.05 and 0.5. Preferably, x≦0.7.

Another class of catalysts useful in the invention are those of Formula I wherein a" and b" are zero and a, a', b, b' and c are each, independently of one another, 0 to 0.5.

Another class of catalysts useful in the invention include those having formula (II):

  (II)

wherein n is a percentage from 0 to 25; N is one or more metals selected from the group consisting of Pt, Pd, Rh, Ru, Re, Os and Ir; x=b+b'+b"+c; b, b', and b" are each, independently of one another, 0 to 0.99; x≦0.7; B, B' and B" are independently selected from the group consisting of Ti, V, Mn, Fe, Co, Cr, Ni, Au, Ag and Cu; c is between 0 and 0.2; δ is a number which renders the catalyst charge neutral; provided that at least one of b, b' and b" is nonzero; provided that when B is Mn, b' or c or n is nonzero.

Another class of catalysts useful in the invention are those having formula (III):

  (III)

wherein n is a percentage from 0.01 to 15; N is one or more metals selected from the group consisting of Pt, Pd, Rh, Ru, Re, Os and Ir; x is (c+y); c is between 0 and 0.2; y is between 0 to 0.95 and is the sum of the amounts of the M's present, which may be the same or different; M is one or more transition metals, preferably selected from the group consisting of: Mn, Fe, Co, Cr and Cu, where each individual member may be present in a different amount than the other members; δ is a number which renders the catalyst charge neutral; provided that when n is zero, at least one of c or y is nonzero. In this class of compounds, preferably, N is Pt. Preferably, n is a percentage from 0.01 to 10, more preferably, n is a percentage from 0.01 to 5, and most preferably, n is a percentage from 0.1 to 3.

Another class of catalysts useful in the invention are those having formula (IV):

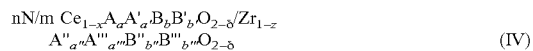  (IV)

wherein n is a percentage from 0 to 15; m is a percentage greater than 0; N is one or more metals selected from the group consisting of Pt, Pd, Rh, Ru, Re, Os and Ir; x=a+a'+b+b'; z=a"+a'"+b"+b'"; a, a', a", a'", b, b', b" and b'" are each, independently of one another, 0 to 0.5; δ is a number which renders the catalyst charge neutral; A, A', A" and A'" are independently selected from the group consisting of Gd, La, Sr and Sc; B, B', B" and B'" are independently selected from the group consisting of Ti, V, Mn, Fe, Co, Cr, Ni, Au, Ag and Cu; provided that when n is zero, at least one of a, a', a", a'", b, b', b" or b'" is nonzero.

Another class of catalysts useful in the invention include those having formula (V):

  (V)

wherein n is a percentage from 0 to 15; m is a percentage greater than 0; N is one or more metals selected from the group consisting of Pt, Pd, Rh, Ru, Re, Os and Ir; M is one or more transition metals, preferably selected from the group consisting of: Mn, Fe, Co, Cr and Cu where each individual member may be present in a different amount than the other members; z is a number which renders the catalyst charge neutral; y is the sum of the amounts of the M's present, which can be the same or different; provided that when n is zero, y is nonzero. In this class of compounds, preferably, N is Pt. Preferably, n is a percentage from 0.01 to 10, more preferably, n is a percentage from 0.01 to 5, and most preferably, n is a percentage from 0.01 to 3. Preferably m is a percentage from 0.5 to 25.

Another class of catalysts useful in the invention include those having formula (VI):

  (VI)

wherein n, p and q are percentages from 0 to 50; m is a percentage greater than 0; N is one or more metals selected from the group consisting of Pt, Pd, Rh, Ru, Re, Os and Ir; y is a number which renders the catalyst charge neutral; M is one or more transition metals, preferably selected from the group consisting of: Mn, Fe, Co, Cr and Cu; provided that when n is zero, at least one of p and q is nonzero and at least one of r and s is nonzero. In this class of compounds, preferably N is Pt. Preferably, p and q are less than 50%. Preferably m is 10% to 50%. Preferably n is 5% or less.

Another class of catalysts useful in the invention are those with formula (VII):

$$M_x(M'O_y)_z(CeO_{2-\delta})_{1-(x+z)} \quad (VII)$$

where M is a particle or cluster of one or more transition metals, M'O$_y$ is a transition metal oxide or a mixture of transition metal oxides where y and δ are the appropriate stoichiometry for the oxide(s), and $0.3 \leq (x+z) \leq 1$; z and x are between 0 and 1. In the class above, preferably M and M' are independently selected from the group consisting of: Mn, Fe, Co, Cr and Cu.

A class of catalysts useful in the invention are those catalysts described herein which are not iron oxide and at least one element selected from the group consisting of: titanium, zirconium, cobalt, nickel, cerium, silver, gold, platinum, palladium, rhodium, ruthenium and iridium; which are not zirconium oxide, a lanthanum oxide and at least one metal selected from the group consisting of manganese, iron, cobalt, nickel, tungsten, copper, silver, gold, platinum, palladium, rhodium, ruthenium and iridium; and which are not a mixed oxide of cerium oxide and zirconium oxide, where cerium oxide is 75-80 mol % of the catalyst.

A preferred class of catalysts useful in the invention are those containing cerium and manganese, and optionally containing platinum. Another preferred class of catalysts are those containing cerium and manganese and at least one other metal, and optionally containing platinum. Catalysts containing only cerium and manganese preferably contain more than 10 wt. % manganese. In one class of catalysts, cerium is 70% or less of the catalyst. Another preferred class of catalysts includes those containing cerium, along with one or more of Mn, Co, Cr and Cu. Another preferred class of catalysts includes those containing cerium and zirconium, along with one or more of Mn, Co, Cr and Cu. Another preferred class of catalysts includes those containing both Mn and Cu. Another preferred class of catalysts includes those containing cerium, manganese and one or more of Co, Cr and Cu. When Fe is used in the catalysts, it is preferred that it be combined with cerium and one or more of Mn, Co, Cr and Cu. Catalysts containing only cerium and cobalt preferably contain more than 20 wt. % cobalt. The classes of catalysts described herein are useful in the methods of the invention for destroying an organic compound in liquid media.

Catalysts of the invention may be a mixture of oxides, they may be single-phase materials, or multi-phase materials.

When used in a method for destroying organic compounds in liquid media and the only components of the catalyst are cerium and copper, the amount of cerium in the catalyst is less than or equal to 70 wt. %. When used in a method for destroying organic compounds in liquid media, the catalyst of the invention does not contain only manganese and cerium in a 1:1 ratio.

Temperatures used in the methods of the invention are typically low temperatures (from about 300° C. and below). Preferably, temperatures below 250° C. are used. The pressure used in the methods of the invention is preferably sufficient to maintain at least one component of the liquid media in the liquid phase. When wastewater is treated, these pressures are typically from 0.5 to 20 MPa. The methods may further comprise both a combination of temperature and pressure sufficient to reduce the concentration of at least one organic compound in said liquid media to a selected value. Determination of such temperature and pressure is well within the skill of one of ordinary skill in the art without undue experimentation. The compositions of the invention and methods of the invention may be used to treat any aqueous stream where wet air oxidation is used.

Also provided are catalyst compositions for destruction of organic compounds in liquid media comprising: at least one of cerium and zirconium with at least one member of the group consisting of: Gd, La, Sc, Cr, Ti, V, Mn, Fe, Co, Ni, Au, Ag, Cu Pt, Pd, Rh, Ru, Re, Os and Ir; and a support. All catalysts described herein, including those described as useful for the methods of the invention, may also be used in the catalyst compositions for destroying an organic compound in liquid media.

A particular catalyst composition for destroying an organic compound in liquid media comprising a catalyst having the formula (VIII):

$$nN/Ce_{1-x}Zr_cB_bB'_{b'}B''_{b''}O_{2-\delta} \quad (VIII)$$

wherein n is a percentage from 0 to 25; N is one or more metals selected from the group consisting of Pt, Pd, Rh, Ru, Re, Os and Ir; x=b+b'+b''+c; b, b' and b'' are each, independently of one another, 0 to 0.99; c is between 0 and 0.2; δ is a number which renders the catalyst charge neutral; B, B' and B'' are independently selected from the group consisting of Ti, V, Mn, Fe, Co, Cr, Ni, Au, Ag and Cu; provided that at least one of b, b', b'' is nonzero; and a support. The various useful supports are described further herein.

Catalysts useful in the invention include those with a variety of surface areas, typically ranging from about 20 to about 220 m$^2$/g and preferably above 40 m$^2$/g.

As used herein, "liquid media" is defined as a substance that contains at least one component in the liquid phase. "Liquid media" includes organics and inorganics, and mixtures thereof, and includes solutions or suspensions, and may include particulate matter and other components. Some of these substances include organics, inorganics (such as salts) and biologicals. "Wastewater" is defined as the liquid media that comprises water and one or more organic compounds. "Wastewater" is one class of liquid media, and all characteristics of liquid media also apply to "wastewater". For example, wastewater may include other substances such as particulate matter, and components other than water and one or more organic compounds. Liquid media and wastewater may come from a variety of sources, including pulp and paper mills, sewage, breweries, and chemical processing plants. Preferably, the liquid media and wastewater are oxygen-containing or are contacted with an oxygen-containing substance, and most preferably, the oxygen-containing substance is air. As used herein, "catalyst" includes those catalysts useful for destruction of at least one organic compound in liquid media and wastewater. The catalysts of the invention function in the presence of potentially interfering substances, such as halogen- and nitrogen-, sulfur-, and phosphorous-containing compounds. As used herein, "destruction" refers to reducing the concentration of one or more organic compounds in liquid media and/or wastewater. "Destruction" does not necessarily mean reduction of the concentration of one or all organic compounds in the liquid media or wastewater to zero. As used herein, "mixed metal oxides" include one or more metal oxides. As used herein, "single-phase material" is a material that comprises a single crystallographic phase. As used herein, "multi-phase material" refers to a material wherein some components are single-phase and other components are mixed metal oxides. As used herein, a "precipitating reagent" is a substance or mixture of substances that causes precipitation of a desired substance. Preferred precipitating reagents include NH$_4$OH, (NH$_4$)$_2$CO$_3$, Na$_2$CO$_3$, NaOH, urea and K$_2$CO$_3$. As used herein, "contacting" substances is meant to indicate that substances are physically near each other, but is not intended to mean a homogeneous solution is formed. Preferably, reducing occurs in a hydrogen-containing atmosphere and oxidation occurs in air, but any reaction conditions that produce the desired result may be used. In the catalysts and compositions described herein, the "y" in O$_y$ and the "2−δ" in O$_{2-\delta}$ are both intended to render the catalyst charge neutral, without intending to specify a specific crystal structure or stoichiometry.

Organic compounds destroyed by the catalysts and compositions of the invention include, but are not limited to: acetates, alkanes, alkenes, alcohols, phenols, cyanides, nitrites, aldehydes, ethers, esters, organic acids such as acetic acid or formic acid, amine compounds, amide compounds, amino acid compounds, aromatics, carboxylic acids, ketones, and halogenated hydrocarbons. Amine compounds may be primary, secondary, tertiary or a quaternary amine salt.

Catalysts and compositions of the invention may be used to destroy organic compounds in liquid media containing any concentration of organic compounds. In one application, catalysts and compositions of the invention may reduce the concentration of organic compounds in liquid media where there is between 10 ppm and percent levels of organic compounds.

All individual values and ranges of values disclosed herein are included in the invention, unless they are known in the art. All catalysts and compositions described herein are included in the invention, unless they are known in the art to be useful in catalytic wet-air oxidation of organic compounds.

DETAILED DESCRIPTION OF THE INVENTION

Figure 1:
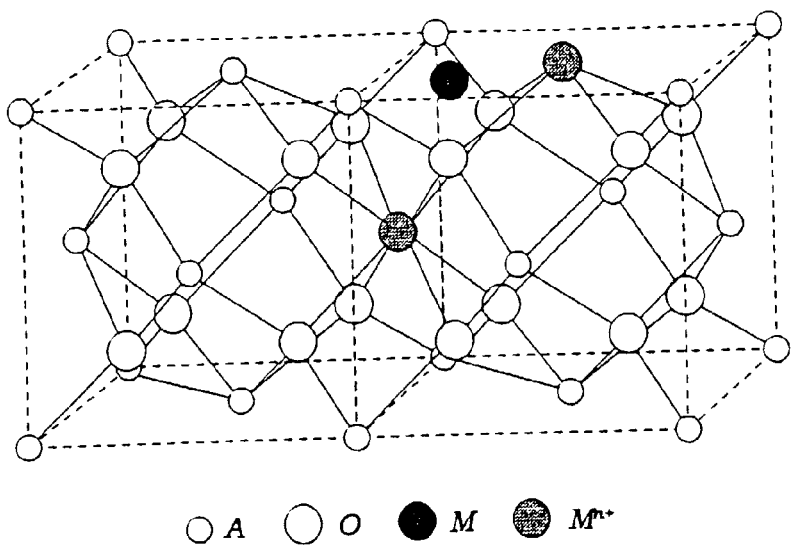
FIG. 1 is the crystallographic structure of doped fluorite-type oxides.

The catalysts and compositions described in this invention are useful for increasing the activity for the destruction of organic compounds in liquid media at lower temperatures and pressures than previously reported. High activity for the destruction of organic compounds is achieved through a combination of appropriate catalyst elements and preparation procedures that optimize material qualities such as oxygen mobility, oxygen storage capacity, resistance to poisons, textural properties, metal dispersion, and active sites for a range of organic functional groups.

Although applicant does not wish to be bound by theory, the relevant catalytic mechanisms in CWAO are believed to be promoted by increasing the reducibility of the metal oxide component. Specifically, oxygen diffusivity and surface mobility, creation of reactive oxygen species, and synergy between catalytic metal and metal oxide all depend on the ease of the $M^{(n-1)+} \leftrightarrows M^{n+}$ couple of the oxide component. Oxidation activity of CeO$_2$-based catalysts has been reported to be promoted by introducing Zr into the CeO$_2$ fluorite lattice, which produces a structural modification that enhances Ce$^{4+}$→Ce$^{3+}$ reduction (Leitenburg, C. d., Goi, D., Primavera, A., Trovarelli, A., Dolcetti, G. *Appl. Catal. B: Environ.* 1996, 11, L29-L35; Terribile, D., Trovarelli, A., Leitenburg, C. d., Primavera, A., Dolcetti, G. *Catal. Today* 1999, 47, 133). A similar effect is afforded by incorporation of certain transition metals. (Leitenburg, C. d., Goi, D., Primavera, A., Trovarelli, A., Dolcetti, G. *Appl. Catal. B: Environ.* 1996, 11, L29-L35; Terribile, D., Trovarelli, A., Leitenburg, C. d., Primavera, A., Dolcetti, G. *Catal. Today* 1999, 47, 133). Specifically, the indicated transition metals have multiple oxidation states, relatively weak bonding to oxygen and high surface oxygen exchange rates, and are known oxidation catalysts (Spivey, J. J. *Ind. Eng. Chem. Res.* 1987, 26, 2165-2180). Additionally, Cu can produce small highly-dispersed metallic clusters that act as additional active sites (Liu, W., Flytzani-Stephanoupoulous, M. *J. Catal.* 1995, 153, 317-332). Furthermore, Cu imparts water tolerance, (Liu, W., Flytzani-Stephanoupoulous, M. *J. Catal.* 1995, 153, 317-332) and the electrophilicity of $Cu^+$ increases activation for organic compounds with $\pi$ bonds.

In order to increase the water tolerance and oxidation rate in water, the catalysts can be composited with fluorinated carbon, polytetrafluoroethylene fibers, hydrophobic styrene divinylbenzene copolymer (SDB) may be used as a support, or any other support or means known to the art to increase the water tolerance of the catalysts may be used. Although applicant does not wish to be bound by theory, it is believed that increasing the hydrophobicity of the support promotes catalytic activity by favoring adsorption and concentration of the organic compounds at the catalyst surface.

The specific components of the catalysts useful in the compositions and methods of the invention can be separated into four categories. The first category includes Ce, which comprises the major portion of the metal oxide component either as $CeO_2$ or doped $CeO_2$. This component acts both as a support in synergy with noble metals, and an active metal oxide oxidation catalyst. An equilibrium between $Ce^{3+}$ and $Ce^{4+}$ results in an exceptionally high oxygen storage and release capacity that facilitates catalytic combustion by providing oxygen directly to catalytically active sites. Furthermore, $CeO_2$-containing catalysts are less susceptible to deactivation from water vapor and more resistant to sintering than catalysts employing inactive metal oxide supports such as $Al_2O_3$. Also included in this category is Zr, which has qualities similar to Ce and improves the low-temperature reducibility of $CeO_2$. The second category includes the metals Gd, La, Sc, and Sr which are incorporated as dopants in $CeO_2$ to promote oxygen vacancies and increase oxygen mobility within the catalyst. The oxygen vacancy association energy for these elements increases in the order Gd<La<Sc<Sr; therefore, varying the identity and concentration of these dopants allows control over the bulk oxygen mobility. The third category includes the metals Ti, V, Co, Cr, Ni, Au, Ag, Mn, Fe, and Cu. These metals contain multiple oxidation states and the corresponding oxides are also good oxidation catalysts. When combined with $CeO_2$, they provide additional catalytic active sites with metal oxygen bond strengths conducive to complete destruction of organic compounds. Finally, the fourth category includes the metals Pt, Pd, Rh, Re, Os, Ru, and Ir. These elements are included in the catalysts mostly in the reduced state dispersed over the surface and within the pores of the metal oxide. Generally, inclusion of one of these fourth category metals in the catalyst significantly improves activity at low temperatures.

Using fluorite-type oxides (such as $CeO_2$ and $ZrO_2$) with appropriate dopants, in combination with other materials that have high oxygen exchange rates and demonstrated oxidation activity as metal supports (such as $MnO_x$ and $Fe_2O_3$), significant improvements in the materials used for supported metal catalysts are achieved. The crystallographic structure for a doped defect fluorite oxide is shown in FIG. 1. The fluorite-type metal oxides have a face-centered-cubic structure, with each tetravalent metal atom (O) surrounded by eight $O^{2-}$ ions (A) forming the vertices of a cube. Doping fluorite oxides with divalent or trivalent metals ($M^{n+}$) produces high oxygen vacancy concentrations, which can be controlled by the degree of doping and the specific dopant used. Therefore, choosing dopants with lower association energies will produce oxides with higher oxygen mobility. Catalysts of the invention include those with predominantly fluorite crystal structures. Other structures that may be present include defect fluorite, pyrochlore ($A_2B_2O_7$) and perovskite-like phases. Cerium and zirconium oxide with some amount of dopants are generally present as fluorite structures. Dopants may also be present as oxides.

The catalysts may be coated onto the support material by any method which produces a suitable coating of catalyst, including the method of: (a) treating a mixture of metal salt precursors with a precipitating reagent to form a precipitate; (b) preparing a slurry of said precipitate; (c) coating said slurry onto said support; and (d) calcining said slurry. The catalysts may also be coated onto a support material by: (a) mixing a solution of metal salt precursors with the support; and (b) calcining said precursors. The catalysts may also be coated onto said support material by: (a) mixing the support with one or more metal salt precursors to form a mixture; (b) treating said mixture with a precipitating reagent to form a precipitate; and (c) calcining said precipitate.

The methods above may also further comprise the steps of: (e) adding one or more metals selected from the group consisting of Pt, Pd, Rh, Ru, Re, Os and Ir metal to form a composition; (f) reducing said composition (preferably at temperatures of about 200° C. or higher); and optionally (g) oxidizing said composition (preferably at temperatures of between about 80° C. to about 800° C.).

The invention is useful for a variety of applications, including treatment of sewage sludge, alcohol distillery waste, effluent from pulp and paper mills, cyanide, cyanate and nitrile wastewaters, regeneration of spent carbon and spent earth, oxydesulfuration of coal, energy generation, and other applications, including other applications where catalytic wet air oxidation is used or useful.

The catalytic wet air oxidation methods described herein may be carried out in any suitable apparatus such as bubble columns, mechanically agitated reactors, loop reactors, trickle bed reactors, and other apparatuses known in the art. As long as the catalyst or composition is contacted with the liquid media to be treated for a sufficient time and an appropriate temperature and an appropriate pressure so that the desired level of destruction of organic compound(s) is achieved, the apparatus and conditions used are suitable.

Those of ordinary skill in the art will appreciate that methods, techniques, and components other than those specifically described herein can be employed in the practice of the invention without departing from its spirit scope. The following examples illustrate the invention and are in no way intended to limit its scope.

EXPERIMENTAL

A. Catalyst Synthesis

The catalysts in this invention can be prepared by methods known in the art, including coprecipitation, hydrothermal synthesis, calcination, wash-coating, impregnation-deposition or ceramic processing. Methods of making the catalysts are described herein or are well known in the art, or readily adapted from the methods described herein or those methods well known in the art by one of ordinary skill in the art without undue experimentation. Such methods known in the art are described, for example, in Perego, C. and Villa, P., (1997) Catalysis Today, 34:281-305.

Preparation of Powder Supports. Many powder support materials were prepared by co-precipitation. In this procedure the metal nitrate precursors were dissolved in water (cerium-based) or methanol (zirconium-based) in the appropriate molar ratios. The concentration of the primary metal cation for each support (i.e. cerium and zirconium) before precipitation was approximately 0.4 M. Zirconyl nitrate had to be gently heated with stirring overnight in methanol for dissolution. The precipitant used may be $NH_4OH$, NaOH, KOH, $Na_2CO_3$, urea, $K_2CO_3$, sodium or potassium oxylate, or any other substance able to perform the desired precipitation. In the preparation of most of the powder supports the precipitant used was $NH_4OH$ in concentrations as low as 1 M. During precipitation, the mixture was stirred vigorously. Precipitant was added beyond the calculated stoichiometric equivalence point, until the supernatant liquid tested basic. The resulting precipitates were vacuum filtered and washed with hot distilled water, then dried at about 100° C. for several hours. The dried powders were finely ground and heated in air at temperatures between 400-500° C. for 4-8 hours to produce the metal oxide support. After oxidation, the powders were reground and passed through a 150-μm sieve. The surface areas of the catalysts used were typically between 60 and 180 $m^2/g$.

Coprecipitation typically results in catalyst powders with high surface areas. However, the limitation of this method is that some cations are preferentially precipitated or retained by $NH_4OH$. Therefore, it is important to note that the actual compositions attained by coprecipitation frequently deviate from the target compositions. This problem can be partially overcome using alternative precipitating agents or preparation methods. For example, catalyst C in Table 1 was prepared by completely evaporating a concentrated aqueous solution of the precursor salts, followed by calcination of the resulting salt mixture.

Alternatively, hydrothermal synthesis may be used, as known in the art. Generally, hydrothermal synthesis involves the precipitation of the oxide from the precursor salts with a base; however, the reaction is carried out at temperatures between 100° and 350° C. in a sealed vessel. Preferably a pressure of less than 15 MPa is used, and the samples are aged for 5 to 60 minutes. Following crystallite formation, the crystallite powders are filtered, washed and dried. The hydrothermal process tends to produce ultra fine powders with a very narrow distribution of particle sizes and shapes.

The impregnation/decomposition method may be used, as known in the art.

For ceramic processing, a mixture of the oxides or carbonates in the appropriate stoichiometric ratios was ball milled for 24 hours, then passed through a 355-μm and a 90-μm sieve. The powder was then calcined in a ceramic crucible at 1200° C. for 6 hours. After cooling, the support powder was passed through a 150-μm sieve. This process eliminates problems associated with selective precipitation that might be encountered with coprecipitation; however, the high processing temperatures generally result in catalysts with much lower surface areas.

Incorporation of Pt and Pd. The catalyst metals Pt and Pd were added to the support powders primarily by incipient wetness/impregnation. For the impregnation method, three approaches were used. In the first approach, 1-mL increments of a 10-mg/mL Pt solution were added to the support powder creating a suspension. The suspension was gently heated and stirred until the water evaporated, followed by addition of another 1 mL of Pt solution. This process was repeated until the desired Pt loading was achieved. In the second approach, only a few drops of the Pt solution were added at a time, so that the solution was completely absorbed by the powder. As above, this process was repeated with occasional stirring until the desired metal loading was achieved. For the third approach, the desired volume of Pt precursor solution was mixed with the support powder and rotated under reduced pressure until dry. Following impregnation, the Pt was reduced in a furnace at 300° C. for 3 hours under $H_2$ flowing at 100-200 mL/min.

Several of the catalysts were prepared by adding platinum before the co-precipitation step. For this simultaneous addition method, the appropriate amount of platinum salt was added to the metal nitrate solution before precipitation with the $NH_4OH$ so that the Pt was incorporated into the precipitate rather than only on the support surface.

Catalyst Pretreatment. Catalysts may be preconditioned under oxidative or reductive conditions prior to testing. The oxidative treatment involves heating in air between 100 and 500° C. The reductive treatment involves heating in hydrogen between 300 and 500° C. Preconditioning removes residual precursor counter-ions and may adjust the oxidation states of constituents to affect activity, as known in the art.

Catalysts of the invention have long lifetimes and can be regenerated by heating for a sufficient time to drive off adsorbed organics and moisture. For example, catalysts of the invention may be regenerated by heating at a temperature of about 150° C. or higher.

B. Catalyst Characterization

Catalysts were characterized using various methods, including B.E.T. surface area measurements, particle size measurement, metal particle dispersion, Fourier transform infrared absorption (FTIR), X-ray diffraction (XRD), energy dispersive X-ray spectroscopy (EDX), and scanning electron microscopy (SEM). Other methods, including oxygen temperature programmed desorption (TPD) may also be used.

Surface Area Analysis. The surface area analysis was performed using a Micromeritics ASAP-2000 surface area analyzer/porosimeter with nitrogen/helium mixtures. For this work, surface areas were determined from nitrogen volume/partial pressure isotherms using the B.E.T. method.

Pore size distribution of catalysts was also determined from the multipoint nitrogen isotherm. Initially, it is assumed that adsorption can occur in the micropores of the particles. This behavior is manifested as BET-type adsorption at relatively low values of x, followed by a saturation-type (Langmuir) adsorption as the relative pressure is increased, and the pores fill with adsorbate. The adsorption isotherm in this case is expressed in terms of a quantity possessing units of length.

Particle Size Measurement. Catalyst particle size measurements were performed using a Shimadzu SALD-2001 Particle Size Analyzer. Measurements were obtained by dispersing catalyst powder in ultra-pure water, which was then passed through a flow cell. A collimated beam from a diode laser was directed through the flow cell and the light diffracted and scattered by the particles was detected by sensors in appropriate positions to detect light from all angles. This arrangement of sensors allows detection of light diffracted and scattered from large and small particles, which enables a particle size range of 0.03 μm to 700 μm to be measured. Laser beam intensity distributions were converted into particle size distributions using Shimadzu software that combines Fraunhofer, Mie and side-scatter processing methods. Information from this technique was used to correlate catalyst particle sizes and distributions to preparation methods and catalytic activity.

Metal Particle Dispersion. Group VIII metals used in this work generally adsorb $H_2$ and CO irreversibly at room temperature. The stoichiometry is approximately one H atom or one CO molecule per metal atom, which allows adsorption of these gasses to be used to calculate metal surface area. Based on the determined surface area of the metal and the known amount of metal present, the dispersion of metal particles can be calculated. However, two major factors regarding the catalysts in this work must be considered when interpreting such adsorption data. First, $CeO_2$ and presumably $CeO_2$-based materials adsorb $H_2$ (and $O_2$) which leads to erroneously high dispersion calculations. Second, $CeO_2$-supported Pt possibly will have some activity for the oxidation of CO to $CO_2$, even at low temperatures. This second consideration highlights a major factor leading to ambiguous results for dispersion measurements on supported metals, which is the effect of strong support-metal interactions. It has been demonstrated that such interactions produce unpredictable adsorption stoichiometry characteristics leading to inaccurate calculations of metal dispersion. This effect is particularly pronounced for metals deposited onto supports with reductive pretreatment.

More than one method may be used to determine metal dispersion. First, CO can be used as the probe molecule and a correction for the amount CO converted to $CO_2$ can be made based on mass spectrometer measurements. Second, transmission-electron microscopy can be used to image the metal particles on the support surface. Measurement of the particle diameters will yield a particle size distribution that can be correlated to particle dispersion by making assumptions about the particle shapes. Finally, XRD data can be used to estimate the metal particle sizes, t, according to the Scherrer equation, $$t = 0.9 \lambda / B \cos \theta_B$$

where $\lambda$ is the incident wavelength, B is the peak width at one half of the maximum intensity, and $\theta_B$ is Bragg angle. This method is only effective for small particle sizes, and is difficult to use at very low metal loading.

XRD. XRD analysis was performed on the support powders to confirm their anticipated crystal structures, and determine if the materials are single phase. Diffraction patterns were obtained using wither a Rigaku Miniflex X-ray Diffractometer (Model CN2005) or a Philips PW 1830 with $CuK_\alpha$ line radiation ($\lambda$=1.5418 Å).

Peak positions in the diffraction pattern are determined experimentally as 2θ values. Using Bragg's law, the interplanar spacings, d, are determined. Using commercial software (Micro-Index, Materials Data, Inc.), the crystal lattice symmetry and lattice parameters are calculated from the interplanar spacing. This information allows correlation of catalyst powder activity with crystallographic structural parameters, and allows determination if the support materials are single phase or mixed oxides.

Figure 2:
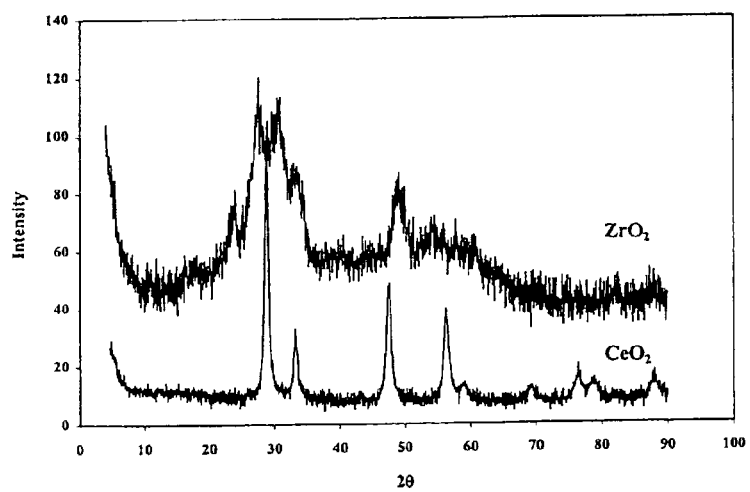
FIG. 2 shows XRD patterns for ZrO$_2$ and CeO$_2$.

FIG. 2 shows the XRD patterns for $CeO_2$ and $ZrO_2$, and indicates that the ceria is primarily a single-phase fluorite structure material, whereas the $ZrO_2$ is mostly amorphous. The majority of the doped $CeO_2$ support powders demonstrated XRD patterns like $CeO_2$, and were determined to be primarily single phase. Examples of these materials include $Ce_{0.8}Zr_{0.2}O_{2-\delta}$, $Ce_{0.8}Gd_{0.2}O_{2-\delta}$, $Ce_{0.8}Co_{0.2}O_{2-\delta}$, $Ce_{0.8}Cu_{0.2}O_{2-\delta}$, and $Ce_{0.8}Fe_{0.2}O_{2-\delta}$, $Ce_{0.48}Zr_{0.5}Mn_{0.48}O_{2-\delta}$, and $Ce_{0.45}Zr_{0.05}Mn_{0.45}Cu_{0.05}O_{2-\delta}$. However, some catalysts have significant multi-phase contributions such as mixed oxide catalysts such as 10% $CuO/CeO_2$ (data not shown).

Figure 3:
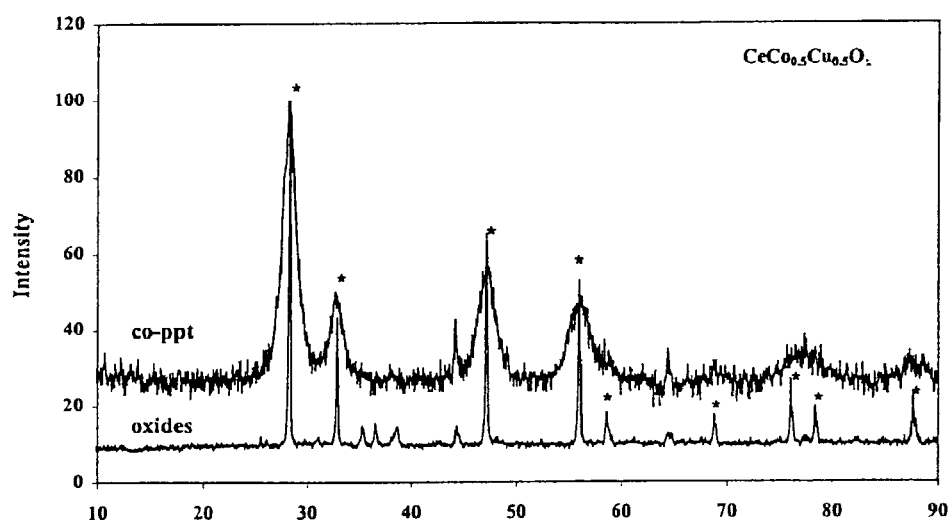
FIG. 3 shows XRD patterns for CeCo$_{0.5}$Cu$_{0.5}$O$_{2-\delta}$ prepared by co-precipitation and from the constituent oxides using ceramic processing.

FIG. 3 shows the XRD patterns for $CeCo_{0.5}Cu_{0.5}O_{2-\delta}$ prepared by co-precipitation from the metal nitrates, and from the metal oxides using ceramic processing. Both samples demonstrated primarily a fluorite structure (indicated with asterisks); however, the sample prepared from the oxides had much greater crystallinity resulting from the higher processing temperatures. Furthermore, contributions from other phases are clearly evident in the latter sample. Specifically, the peaks between 2θ values of 30 and 50 are from $Co_3O_4$ and CuO.

Figure 4:
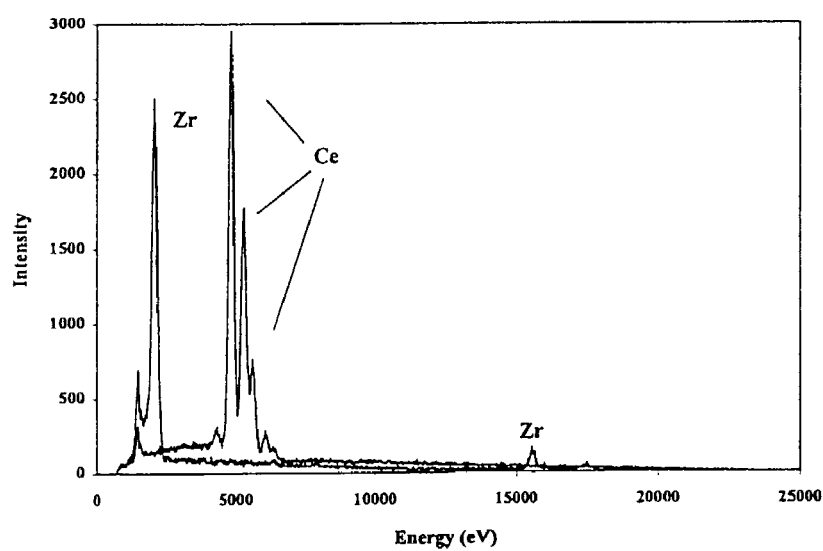
FIG. 4 shows an overlay of the EDX spectra for CeO$_2$ and ZrO$_2$.
Figure 5:
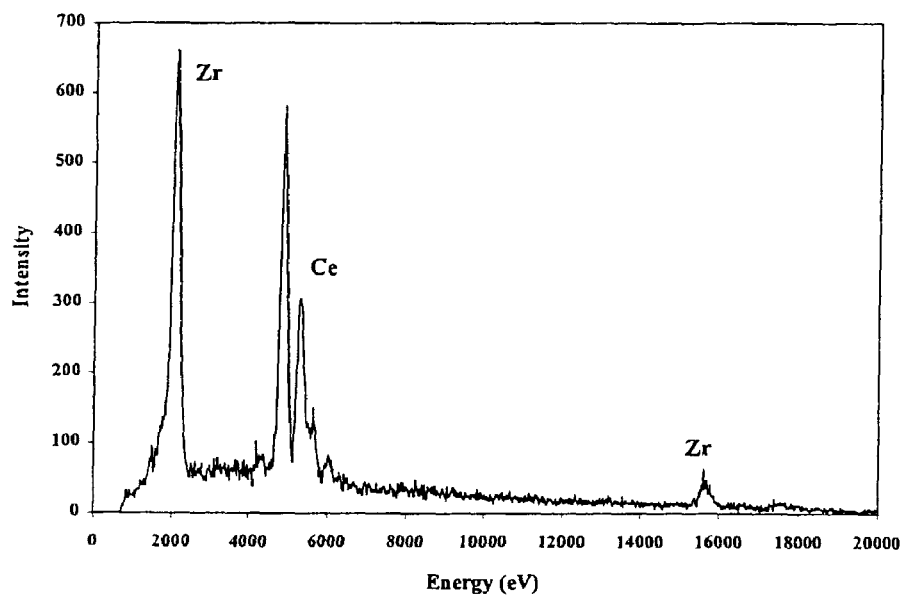
FIG. 5 shows the EDX spectra for ZrO$_2$ wash-coated with CeO$_2$ (25 wt. % CeO$_2$/ZrO$_2$).
Figure 6:
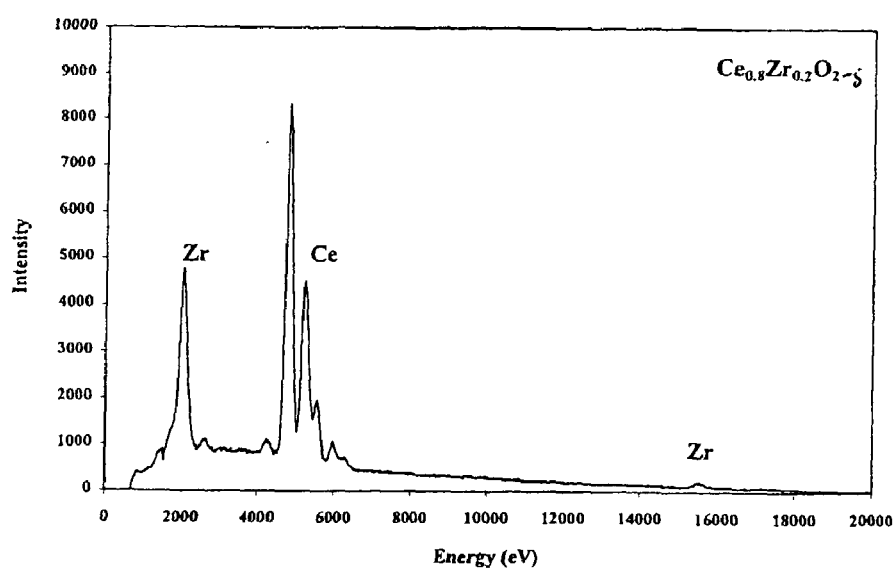
FIG. 6 shows the EDX spectra for Ce$_{0.8}$Zr$_{0.2}$O$_{2-\delta}$.

EDX measurements were obtained on a PGT (Princeton Gamma-Tech) X-ray fluorescence detector in combination with a JEOL JSM T200 Scanning Electron Microscope. FIG. 4 shows an overlay of the EDX spectra for $CeO_2$ and $ZrO_2$. For comparison, FIGS. 5 and 6 show the spectra for $ZrO_2$ wash-coated with $CeO_2$ (25 wt. % $CeO_2/ZrO_2$) and $Ce_{0.8}Zr_{0.2}O_{2-\delta}$, respectively. For the wash-coated sample, the $CeO_2$ covers the majority of the surface of the $ZrO_2$ particles, and the EDX spectra over most of the sample surface show peaks only for Ce. However, the spectrum in FIG. 5 is from a recess in the surface, and peaks from Zr also are present. The XRD pattern for this support powder (data not shown) shows broad peaks corresponding to the fluorite structure, but the crystallinity appears intermediate between the $ZrO_2$ and $CeO_2$ XRD patterns shown in FIG. 2, as would be expected. Alternatively, the EDX spectrum of $Ce_{0.8}Zr_{0.2}O_{2-\delta}$ shown in FIG. 6 generates peaks for both Ce and Zr over the entire surface, and the XRD pattern demonstrates a crystallinity equivalent to the undoped $CeO_2$. These results suggest successful doping of Zr into the $CeO_2$ lattice, and are indicative of the structural differences between the two materials.

Figure 7:
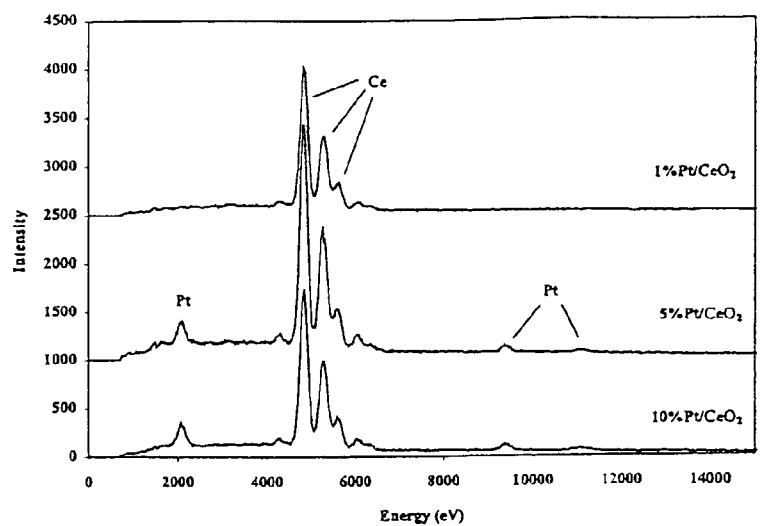
FIG. 7 shows an overlay of the EDX spectra for 1 wt.-% Pt, 5 wt.-% Pt, and 10 wt.-% Pt on CeO$_2$.
Figure 8:
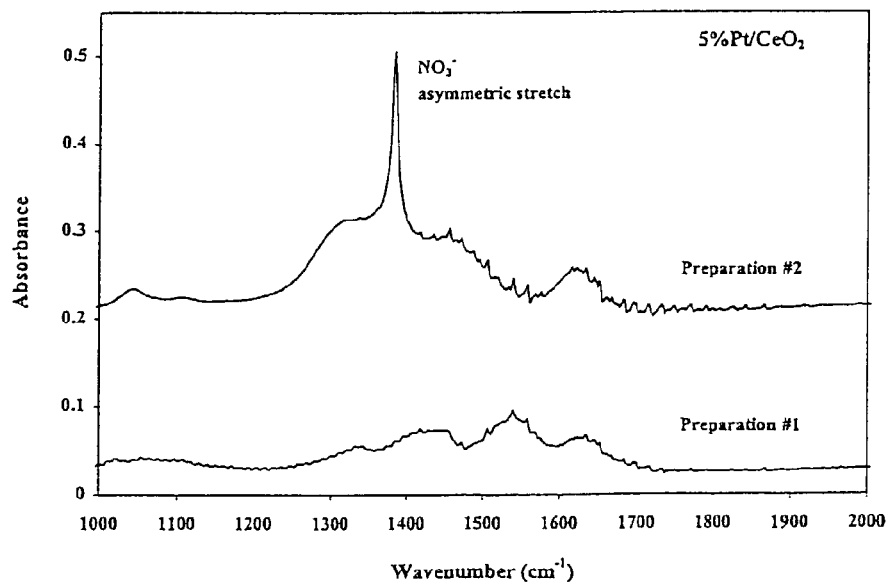
FIG. 8 shows FTIR spectra of 5% Pt/CeO$_2$ prepared by different methods.
Figure 9:
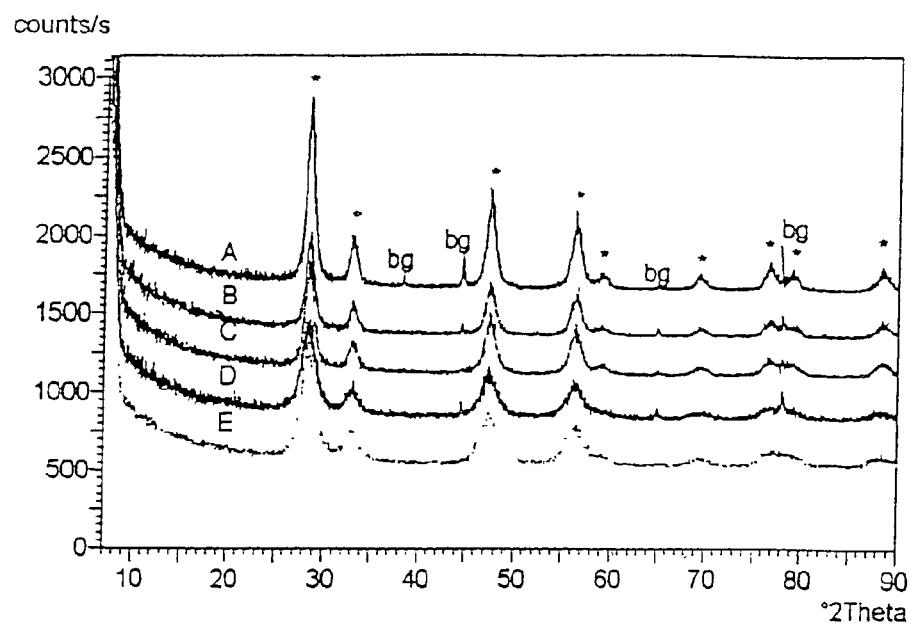
FIG. 9 shows XRD results for Ce$_{1-x}$Cu$_x$O$_{2-\delta}$ without Pt, where x is 0.1 (A), 0.2 (B), 0.3 (C), 0.4 (D), and 0.5 (E).
Figure 10:
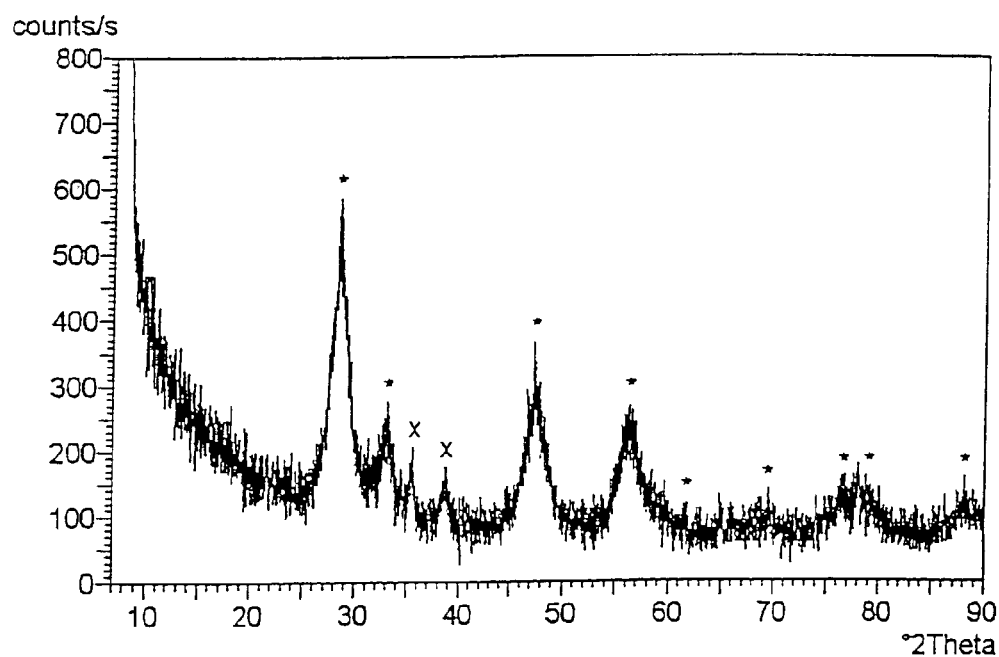
FIG. 10 shows the XRD pattern for Ce$_{0.6}$Cu$_{0.4}$O$_{1.6}$ precipitated with NaOH.
Figure 11:
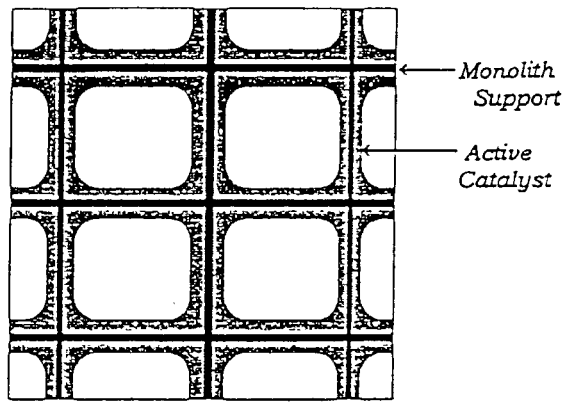
FIG. 11 shows a schematic illustration of a ceramic honeycomb monolith coated with active catalyst.
Figure 12:
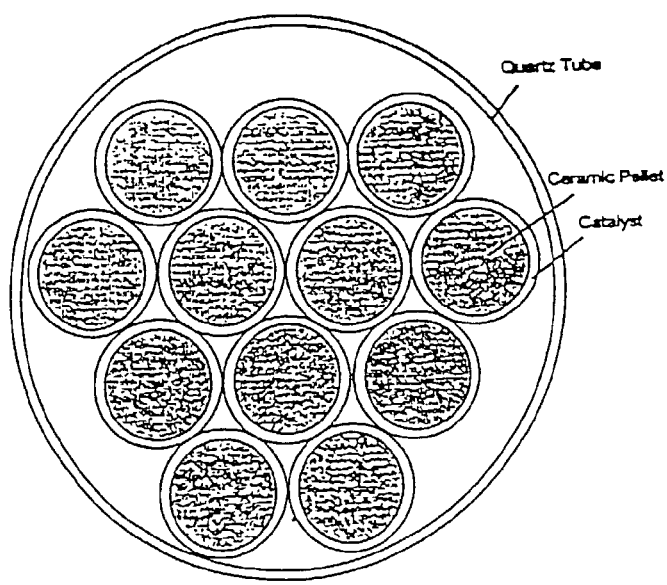
FIG. 12 shows a cross-section diagram of a quartz reactor tube packed with catalyst-coated pellets.

EDX also was used to qualitatively confirm the relative amounts of Pt loading on the support materials. FIG. 7 shows an overlay of the EDX spectra for 1 wt.-% Pt, 5 wt.-% Pt, and 10 wt.-% Pt on $CeO_2$. The baselines are offset for clarity. The peaks for Ce are visible in all three spectra; however, only the 5% and 10% Pt samples show peaks for Pt. The spectral intensities are not normalized, so a ratio of the most intense Ce peak, $I_{Ce}$, to the most intense Pt peak, $I_{Pt}$, in each spectrum was used to compare the metal loading. From this data, the $I_{Pt}/I_{Ce}$ for the 10% $Pt/CeO_2$ catalysts was more than 1.5 times the value for the 5% $Pt/CeO_2$ catalyst, which suggests the incipient wetness/impregnation method for incorporation of Pt was successful.

FTIR. The FTIR system used was a Nicolet Impact 410 spectrometer. This system employs a mid-IR source, a Michelson interferometer, and a deuterated triglycine sulfate (DTGS) detector. Calibration of the FTIR for peak height, area, and position was accomplished using 38.1- and 76.2-µ polystyrene films. The catalyst samples were prepared for FTIR analysis by grinding approximately 1 mg of catalyst powder with 75 mg of KBr and pressing the mixture into a pellet. The spectrum of a pellet with KBr only was subtracted from the background of all spectra.

C. Catalytic Wet Air Oxidation Studies

Figure 13:
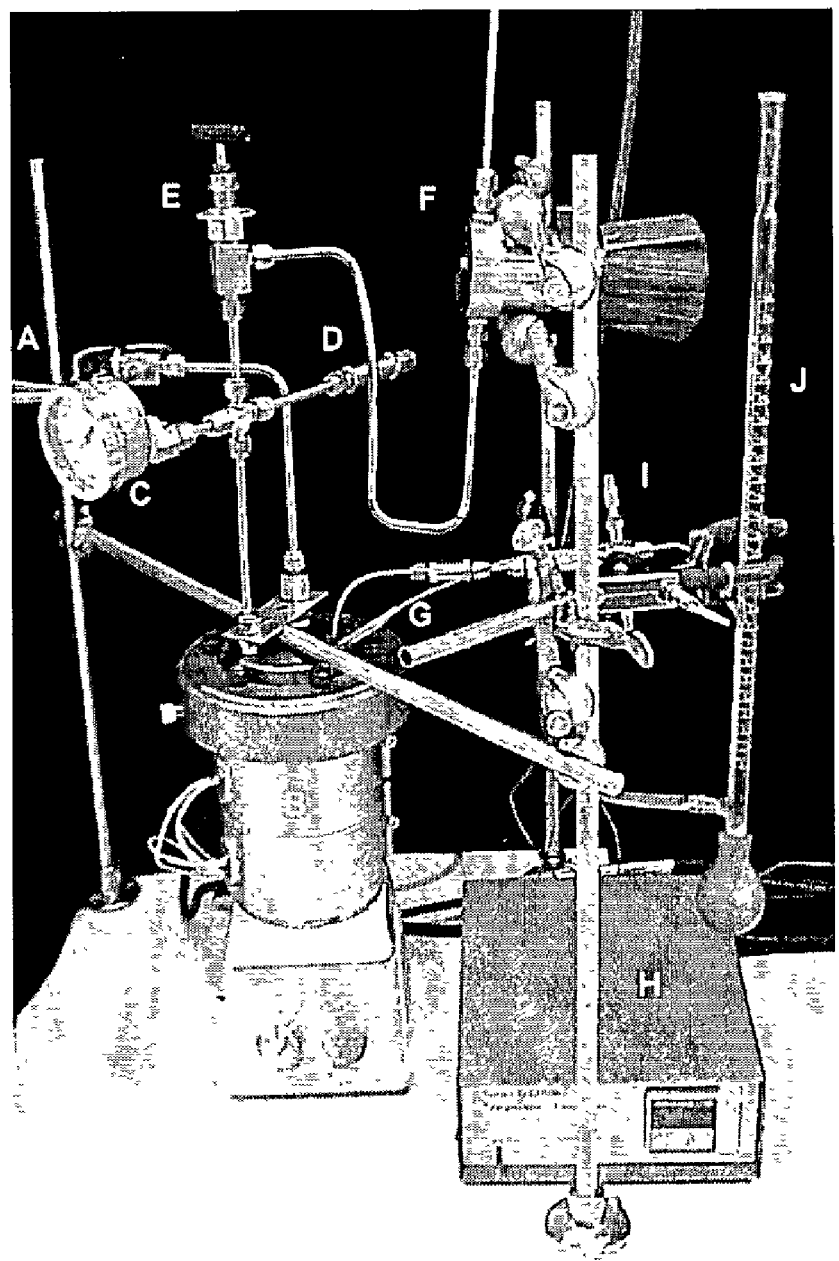
FIG. 13 shows a schematic diagram of the testing apparatus used.

Testing Apparatus. Catalysts were tested in the testing apparatus shown in FIG. 13. The apparatus consists of a 1000-mL Parr reaction vessel heated with band heaters (B). Oxygen and nitrogen are fed to the reactor through ports located at (A). Pressure within the vessel is monitored with gauge (C) and controlled with a back-pressure regulator (F). Gas flow exiting the system is monitored with a flow meter (J). The temperature within the reaction vessel is monitored with a thermocouple (G) and adjusted with a temperature controller (H). The sample is stirred using the magnetic stir plate (K), and samples are drawn through the port located at (I). Testing conditions were 200° C. and 300 psi (2.1 MPa, 20 atm) unless otherwise indicated.

For each test, 300 mL of a 1000-mg/L aqueous acetic acid solution was charged into the vessel with 3 g of catalyst. This concentration of acetic acid corresponded to a total organic carbon (TOC) concentration of 400 mg/L. The vessel was sealed, pressurized, and purged with $N_2$ at a flow rate of 100 to 300 mL/min for approximately 2 hours while the vessel was heated to the desired test temperature. Once the test temperature was achieved, stirring of the solution was initiated, the gas flow was switched from $N_2$ to $O_2$, and the vessel pressure was fine adjusted to the desired test pressure. Initial Percent removal of TOC was calculated according to, $$TOC\ Removal\ (\%) = \left(1 - \frac{[TOC]_t}{[TOC]_o}\right) \times 100$$

where $[TOC]_t$ was the TOC concentration at a time t into the experiment, and $[TOC]_o$ was the initial TOC concentration.

Catalysts Tested and performance tests. Table 1 lists some of the catalysts that have been tested.

TABLE 1

Summary of Some Catalysts Tested

| Designation in FIG. 1 | Catalyst | Surface Area (m²/g) |
|---|---|---|
| A | $Ce_{0.5}Mn_{0.5}O_{1.8}$ | 120 |
| B | $Mn_{0.45}Fe_{0.45}Ce_{0.1}O_{1.6}$ | 39 |
| C | $Mn_{0.475}Zr_{0.05}Ce_{0.475}O_{1.8}$ | 64 |
| D | $Ce_{0.5}Fe_{0.1}Cu_{0.4}O_{1.6}$ | 170 |
| E | $Ce_{0.5}Cu_{0.5}O_{1.5}$ | 172 |
| F | $Ce_{0.8}Cu_{0.2}O_{1.8}$ | 120 |
| G | $Ce_{0.9}Cu_{0.1}O_{1.9}$ | 85 |
| I | $Ce_{0.95}Cu_{0.05}O_{1.95}$ | — |
| H | $Ce_{0.95}Zr_{0.05}O_2$ | 114 |
| | $Ce_{0.95}Mn_{0.05}O_y$ | 64.2 ± 0.3 |
| | $Ce_{0.9}Mn_{0.1}O_y$ | 84.5 ± 0.5 |
| | $Ce_{0.8}Mn_{0.2}O_y$ | 93.3 ± 0.3 |
| | $Ce_{0.5}Mn_{0.5}O_y$ | 71.8 ± 0.5 |
| | $Ce_{0.95}Co_{0.05}O_y$ | — |
| | $Ce_{0.9}Co_{0.1}O_y$ | — |
| | $Ce_{0.8}Co_{0.2}O_y$ | — |
| | $Ce_{0.5}Co_{0.5}O_y$ | — |
| | $Ce_{0.95}Cr_{0.05}O_y$ | — |
| | $Ce_{0.8}Cr_{0.2}O_y$ | — |
| | $Ce_{0.95}Fe_{0.05}O_y$ | — |
| | $Ce_{0.9}Fe_{0.1}O_y$ | — |
| | $Ce_{0.8}Fe_{0.2}O_y$ | — |
| | $Ce_{0.5}Fe_{0.5}O_y$ | — |
| | $Ce_{0.1}Mn_{0.45}Cu_{0.45}O_y$ | 153 ± 2 |
| | $Ce_{0.1}Mn_{0.45}Co_{0.45}O_y$ | 92.5 ± 0.9 |
| | $Mn_{0.5}Fe_{0.5}O_y$ | — |
| | $Ce_{0.95}Mn_{0.05}O_y$ | 64.2 ± 0.3 |

Figure 14:
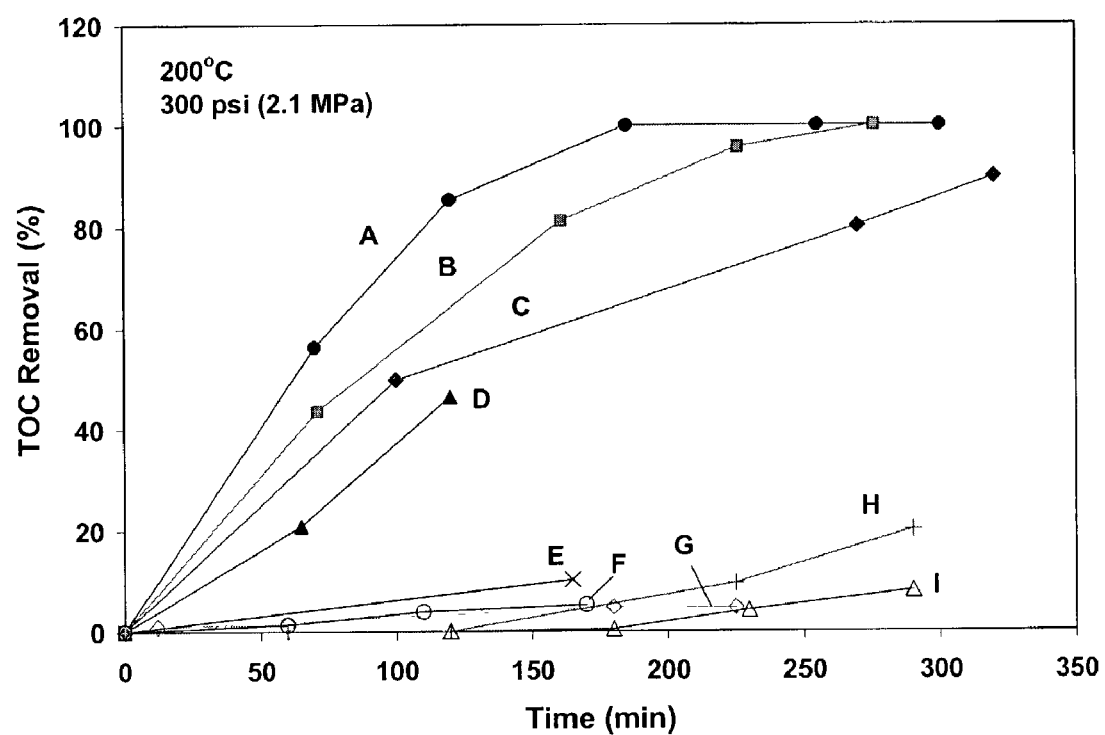
FIG. 14 shows catalyst performance for catalysts A-I in Table 1.

FIG. 14 contains performance evaluation results for the catalysts designated A-I in Table 1. The test solution was 1000 mg/L acetic acid in water, which corresponded to an initial TOC of 400 mg/L. In this group of catalysts, A, B, and C were the most active catalysts, and each contained large quantities of Mn in the formulation. Conversely, catalysts E, F, G, and I emphasized Cu, which resulted in very low activity for the test application. In fact, results for these catalyst were comparable to a "blank" run containing no catalyst, which demonstrated less than 4% TOC removal at the end of a 230-min test period. Catalyst D also had a high Cu concentration, yet demonstrated intermediate activity. Based on the results for catalyst B, the significant activity of catalyst D likely was due to the presence of Fe in the formulation. Results for catalyst H suggested that Zr had little benefit promoting activity, however, this additive adds to catalyst stability. Although the Cu-doped catalysts had low activity, it was noteworthy that both the activity and surface area increased with increasing Cu content. Considering the similar performance of these samples, differences in activity could be attributed to surface area.

Figure 15:
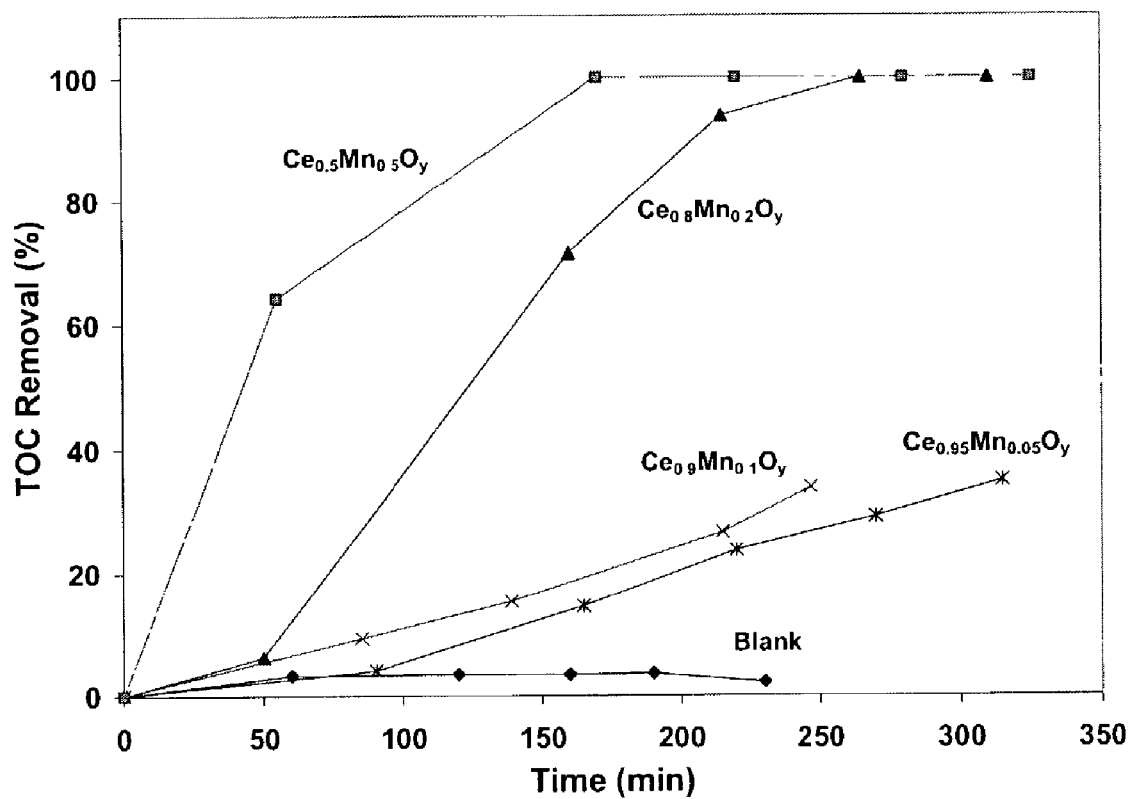
FIG. 15 shows catalyst performance for some Ce—Mn catalysts.
Figure 16:
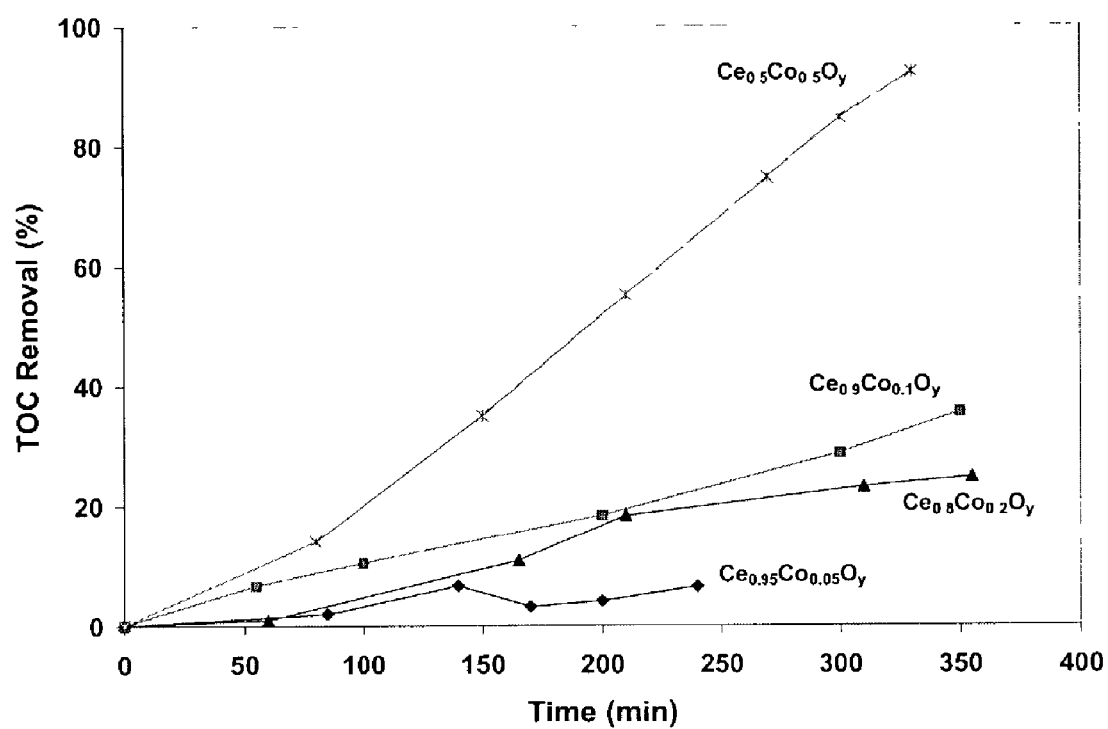
FIG. 16 shows catalyst performance for some Ce—Co catalysts.
Figure 17:
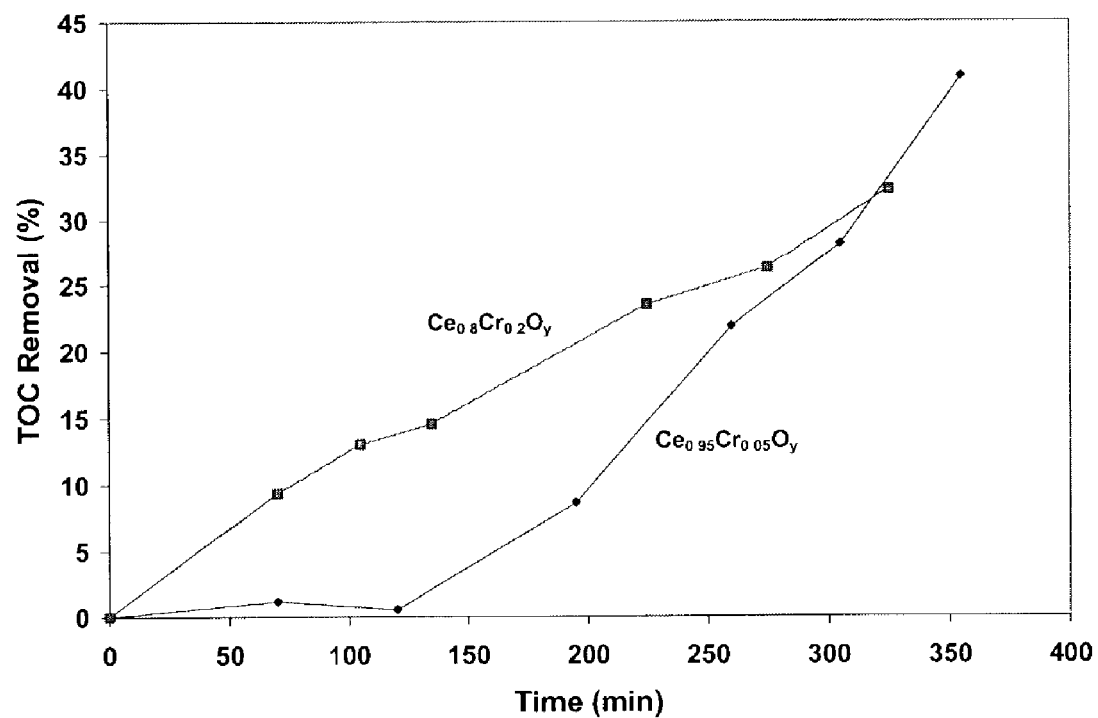
FIG. 17 shows catalyst performance for some Ce—Cr catalysts.
Figure 18:
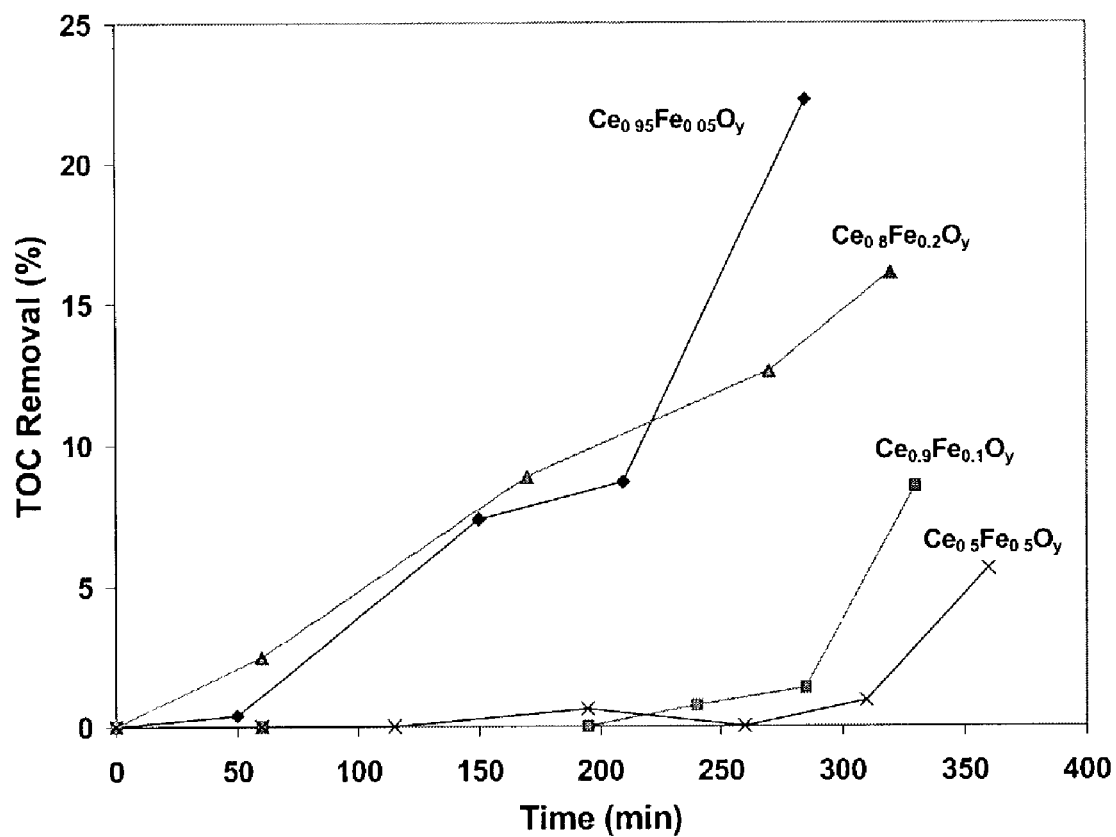
FIG. 18 shows catalyst performance for some Ce—Fe catalysts.

FIGS. 15-18 show results for some Ce—Mn, Ce—Co, Ce—Cr, and Ce—Fe catalysts, respectively. In FIGS. 15-18, the test solution was 1000 mg/L acetic acid in water, which corresponded to an initial TOC of 400 mg/L. The test temperature was 200° C. and the pressure was 300 psi. Of these categories, the Ce—Mn catalysts were clearly the most active, with $Ce_{0.5}Mn_{0.5}O_y$ achieving greater than 60% TOC removal within the first 50 minutes of testing. Furthermore, FIG. 15 shows that catalyst activity increased as the Mn content of the catalyst increased from a fraction 0.05 to 0.5. The Ce—Co and Ce—Cr catalysts shown in FIGS. 16 and 17 were very close in activity for Co and Cr fractions ≦0.2. However, the $Ce_{0.5}Co_{0.5}O_y$ catalyst was significantly more active than the other analogs, achieving roughly 50% TOC removal after 200 minutes of testing, and nearly complete TOC removal after 330 minutes. As with the Ce—Mn catalysts, the Ce—Co and Ce—Cr catalyst were more active with higher transition metal additive content.

The most active Ce—Fe catalyst achieved only 22% TOC removal after 285 minutes of testing. Moreover, unlike the other catalysts, activity decreased with increasing Fe content.

Figure 19:
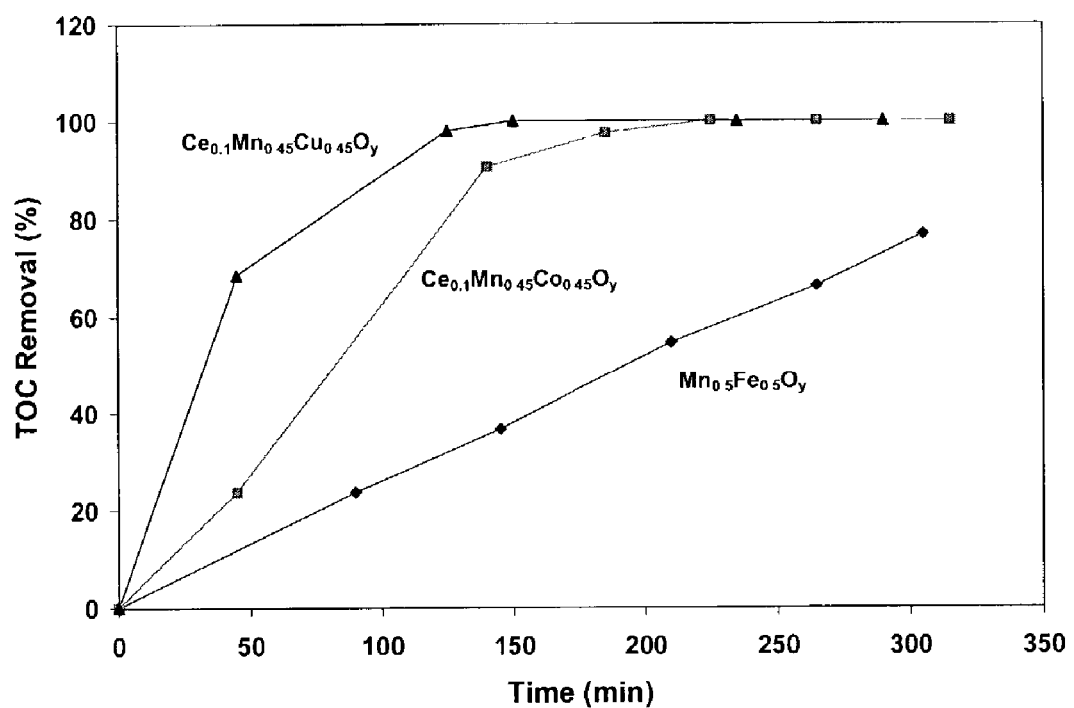
FIG. 19 shows catalyst performance for some Ce—Mn—Cu, Ce—Mn—Co, and Mn—Fe catalysts.

FIG. 19 contains results for three multi-transition metal catalysts that de-emphasize Ce. The test conditions were the same for FIGS. 15-18. Each catalyst contained a large quantity of Mn and were very active relative to the others. However, only $Ce_{0.1}Mn_{0.45}Cu_{0.45}O_y$ was more active than $Ce_{0.5}Mn_{0.5}O_y$. However, as shown in Table 1, this catalyst had a particularly high surface area of 153±2 m²/g.

Preparation of Supported catalysts. Supported Pt analogs were prepared by forming a slurry of approximately 3 g of metal oxide catalyst powder and 9 mL of a 10-mg/mL Pt solution. The Pt precursor was $(NH_3)_4Pt(NO_3)_2$ and the precursor solution was acidified to pH≈3.5 with nitric acid. The slurry was mixed for one hour, then roto-evaporated under vacuum at 70° C. The resulting powder was dried at 90° to 100  C. in air, then reduced at 350° C. under 10 vol. % $H_2$ (bal. Ar).

A hydrophobic catalyst was prepared using a 1-to-1 ratio of $Ce_{0.1}Mn_{0.45}Cu_{0/45}O_y$ and fluorinated carbon (CarboFluor™, Advance Research Chemicals, Inc., CAS #51311-17-2, grade 2065). The fluorinated carbon had a total fluoride content of 64%, a particle size<1 μm, and a surface area of 340 m²/g. An aqueous catalyst nitrate precursor was solution was prepared in at a concentration sufficient to yield 10 g of $Ce_{0.1}Mn_{0.45}Cu_{0.45}O_y$ catalyst, then mixed with 10 g of the fluorinated carbon. Approximately 1 wt. % of Triton-X was added to the solution to enable dispersion of the fluorinated carbon. The mixture was shaken vigorously, and sonicated for approximately one hour. Most of the water was roto-evaporated from the mixture under vacuum at 70° C. The resulting powder was dried in air at 90° to 100° C., then calcined in air at 450° C. for 16 hours.

Table 2 contains a list of some of the supported catalysts tested.

Figure 20:
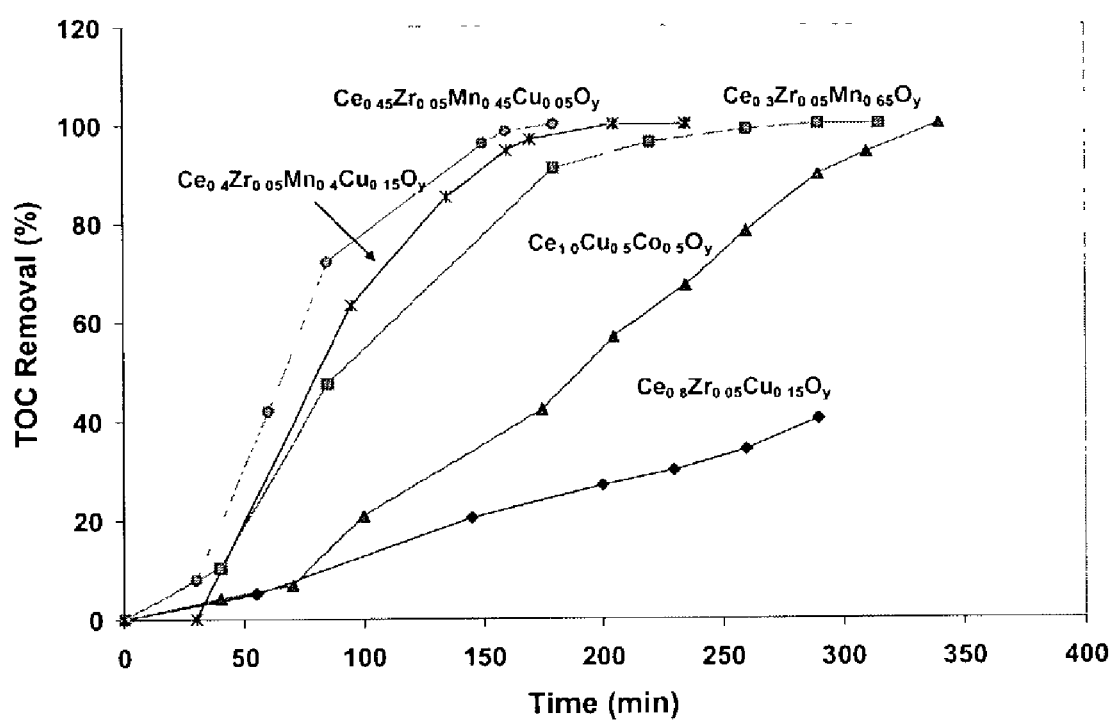
FIG. 20 shows TOC removal over time for several mixed-metal-oxide catalysts.

Mixed-Metal Oxide Catalysts. FIG. 20 shows TOC results for Mn- and Cu-doped $CeO_2$—$ZrO_2$ catalysts. In FIG. 20, the test conditions were the same as for FIGS. 15-18. In the experiments shown in FIG. 20, oxygen was passed through the reactor at ~100 to 300 mL/min during the test. The Ce—Zr—Mn catalyst was much more active than the Ce—Zr—Cu catalysts, but the best results were obtained for the two catalysts that contained both dopants. Activity of $Ce_{0.4}Zr_{0.05}Mn_{0.4}Cu_{0.15}O_y$ and $Ce_{0.45}Zr_{0.05}Mn_{0.45}Cu_{0.05}O_y$ were comparable to the best metal oxide catalyst tested to date, and the results suggested slightly less Cu in the catalyst was preferred.

TABLE 2

| Catalyst Type | Catalyst |
| --- | --- |
| Multi-Component Metal Oxide | $Ce_{0.8}Zr_{0.05}Cu_{0.15}O_y$ |
| Multi-Component Metal Oxide | $Ce_{0.3}Zr_{0.05}Mn_{0.65}O_y$ |
| Multi-Component Metal Oxide | $CeCu_{0.5}Co_{0.5}O_y$ |
| Multi-Component Metal Oxide | $Ce_{0.45}Zr_{0.05}Mn_{0.45}Cu_{0.05}O_y$ |
| Multi-Component Metal Oxide | $Ce_{0.4}Zr_{0.05}Mn_{0.4}Cu_{0.15}O_y$ |
| Supported Pt | 3 wt. % $Pt/Ce_{0.95}Cu_{0.05}O_y$ |
| Supported Pt | 3 wt. % $Pt/Ce_{0.9}Cu_{0.1}O_y$ |
| Supported Pt | 3 wt. % $Pt/Ce_{0.8}Cu_{0.2}O_y$ |
| Supported Pt | 3 wt. % $Pt/Ce_{0.95}Mn_{0.05}O_y$ |
| Supported Pt | 3 wt. % $Pt/Ce_{0.9}Mn_{0.1}O_y$ |
| Supported Pt | 3 wt. % $Pt/Ce_{0.8}Mn_{0.2}O_y$ |
| Hydrophobic Support | $Ce_{0.1}Mn_{0.45}Cu_{0.45}O_y/CF_x$ |

Figure 21:
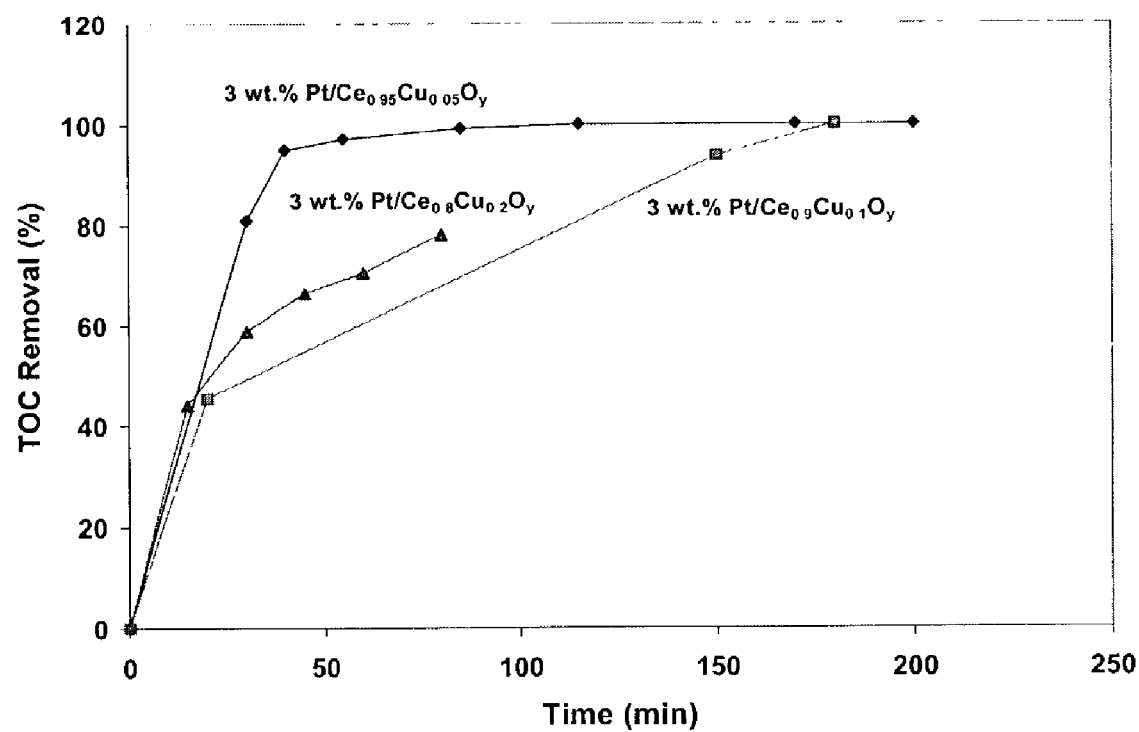
FIG. 21 shows TOC removal over time for Pt supported on Cu-doped CeO$_2$.

Testing of Supported-Pt Catalysts. FIG. 21 contains the first data for Pt catalysts supported on Cu-doped $CeO_2$. In the experiments described in FIG. 21, the test conditions were the same as described in FIG. 20. Although Cu-doped $CeO_2$ was not very active as a metal oxide powder, previous results (not shown) indicated favorable interactions between Pt particles and low concentrations of Cu in $CeO_2$. The 3 wt. % $Pt/Ce_{0.95}Cu_{0.05}O_y$ catalyst shown in FIG. 21 was the most active catalyst tested in this experiment, achieving nearly complete removal of TOC in the first 50 minutes of testing. For comparison, complete TOC removal for the best metal oxide analogs required approximately 150 minutes.

Figure 22:
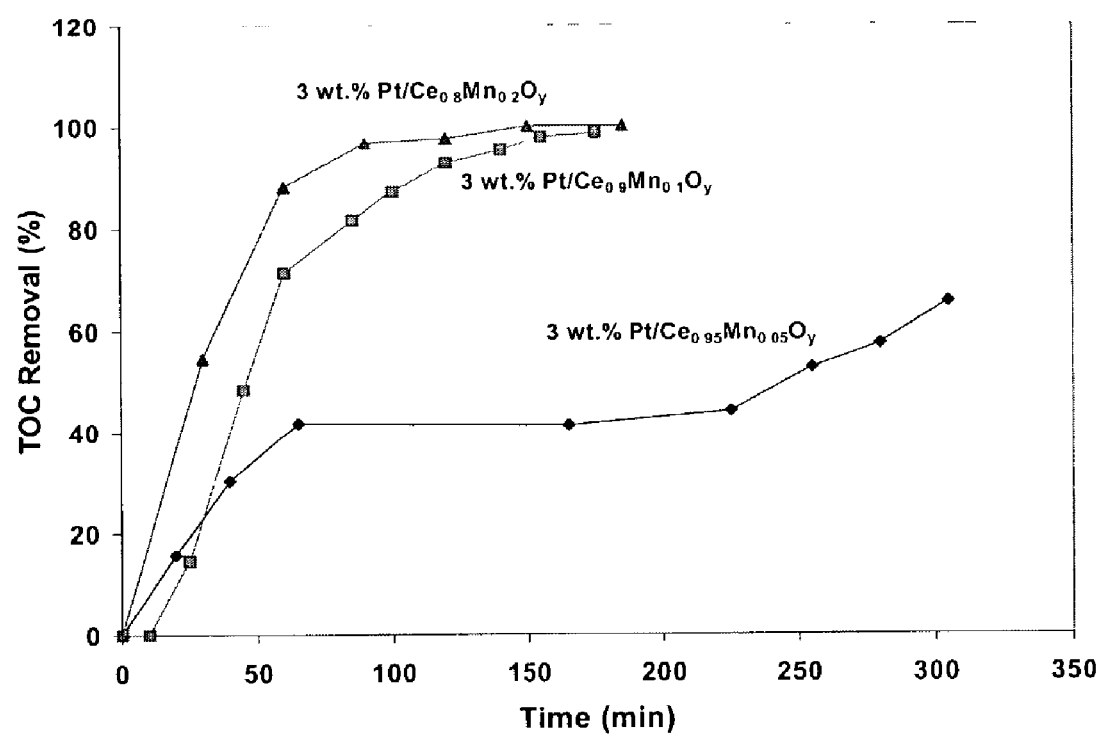
FIG. 22 shows TOC removal over time for Pt supported on Mn-doped CeO$_2$.

FIG. 22 contains results for Pt supported on Mn-doped $CeO_2$ catalysts. In the experiments shown in FIG. 22, the test conditions were the same as those described for FIG. 20. In contrast to the Cu-doped analogs, activity increased with increasing Mn content. The most active composition was 3 wt. % $Pt/Ce_{0.8}Mn_{0.2}O_y$, which achieved nearly complete TOC removal in the first 100 minutes of testing.

Figure 23:
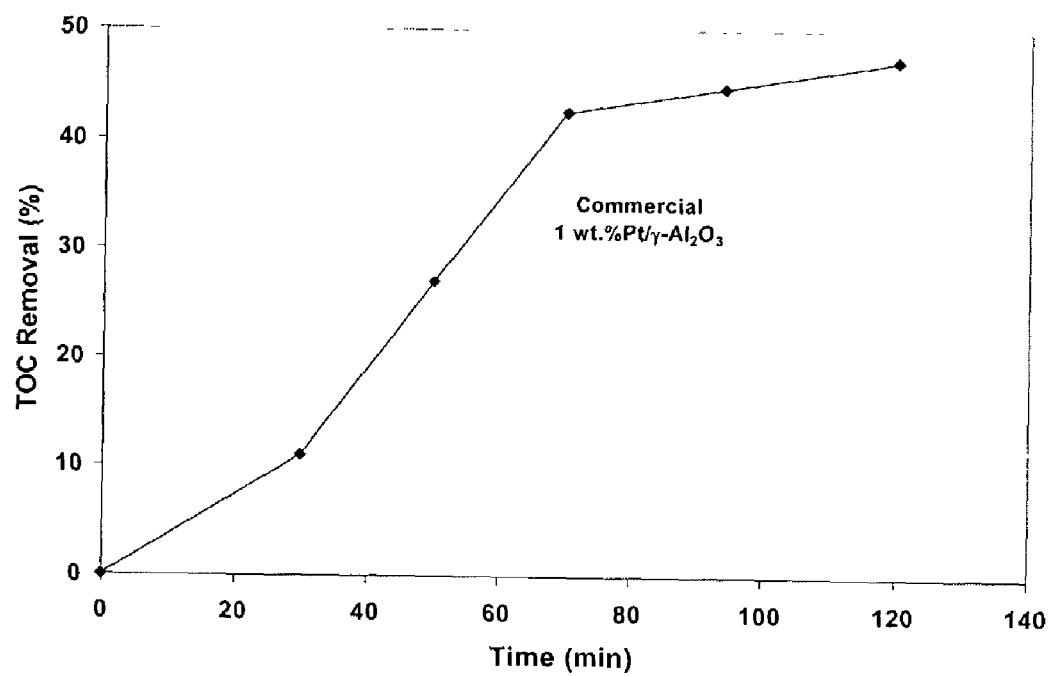
FIG. 23 shows TOC removal over time for commercial 1 wt. % Pt/γ-Al$_2$O$_3$ catalyst (Aldrich, 200 m$^2$/g).

For comparison, FIG. 23 contains results for a commercial 1 wt. % $Pt/\gamma-Al_2O_3$ catalyst (Aldrich, 300 m²/g) tested under the same conditions as above. Although the Pt loading for this commercial catalysts was much less than those in FIGS. 21 and 22, a maximum of only 47% TOC removal was achieved after 120 minutes of testing. This level of activity was substantially lower than the metal oxide catalysts without Pt.

Figure 25:
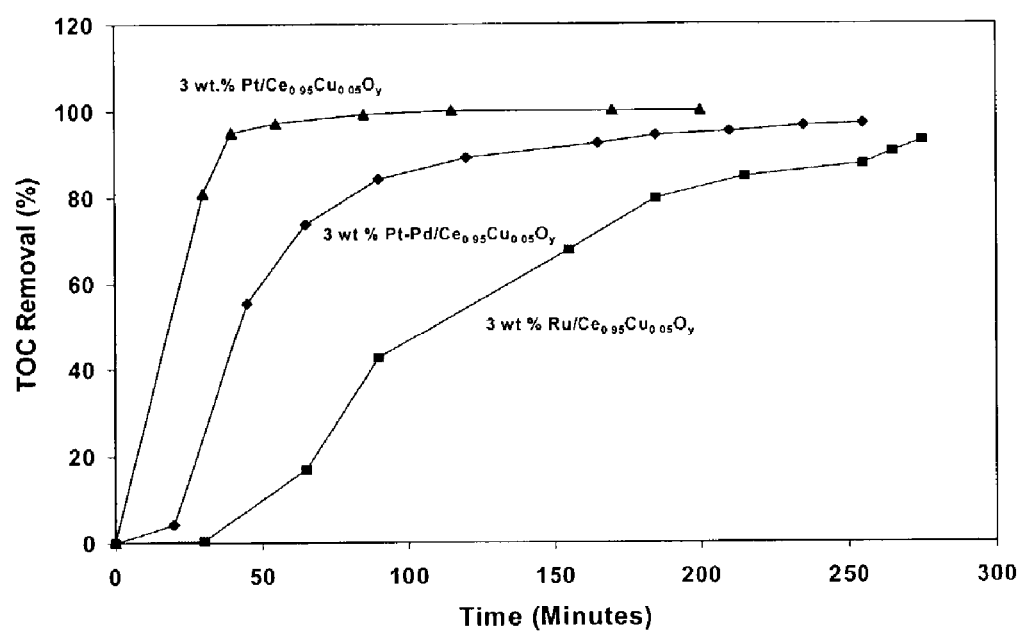
FIG. 25 compares Ce$_{0.95}$Cu$_{0.05}$O$_{2-\delta}$-supported Pt, Pt—Pd (1:1) and Ru catalyst activity for TOC removal in water. The metal loading was 3 wt. % for each catalyst.

FIG. 25 shows the activity of 3 wt. % $Pt/Ce_{0.95}Cu_{0.05}O_y$ and analogs containing Pt—Pd (1:1) and Ru. After 50 minutes of testing, the 3 wt. % $Pt/Ce_{0.95}Cu_{0.05}O_y$ catalyst achieved nearly complete TOC removal, compared to ~60% for the Pt—Pd analog, and only ~10% for the Ru analog. In the experiments described in FIG. 25, the metal loading was 3 wt. % for each catalyst. The test solution was 1000 mg/L acetic acid in water, which corresponded to an initial TOC of 400 mg/L. The temperature was 200° C. and the pressure was 300 psi. A steady flow of $O_2$ was supplied to the reactor during testing.

Figure 24:
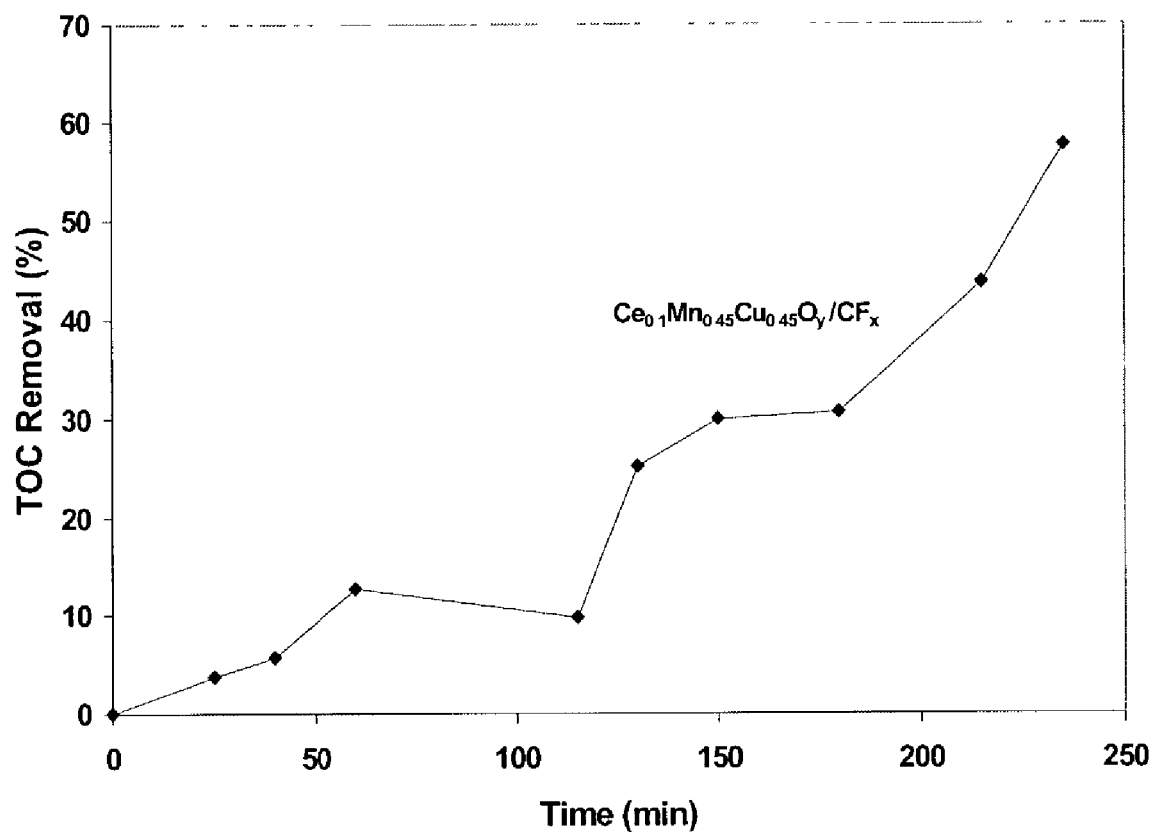
FIG. 24 shows TOC removal over time for a hydrophobic catalyst.

Hydrophobic Catalyst. To test the effect of catalyst hydrophobicity on activity for CWAO, fluorinated carbon was composited with $Ce_{0.1}Mn_{0.45}Cu_{0.45}O_y$. Catalyst fabrication was very successful, resulting in an extremely hydrophobic powder that was nearly impossible to wet. This characteristic resulted in very poor mixing of the catalyst in the test solution, and correspondingly poor catalyst evaluation results despite the fact that $Ce_{0.1}Mn_{0.45}Cu_{0.45}O_y$ was one of the most active catalysts tested to date. FIG. 24 shows that the hydrophobic catalyst only achieved 58% TOC removal after 235 minutes of testing. The same test conditions used for the experiments shown in FIG. 23 were used. A solution to this problem is to produce the catalyst in pellet form and contain the pellets within a basket submerged in the test solution.

Catalysts Supported on Ceramic Saddles. The commercial product for CWAO is preferred to be in the form of larger substrates for ease of handling and post-processing retrieval. Due to the elevated temperatures and pressures, the catalysts also must be structurally and chemically stable. Ceramic saddles were used for initial evaluation of structurally-supported catalysts. Each saddle is a semicircle approximately 1 cm in diameter and 0.5 cm in width. The catalyst deposition method used for this sample produced a very even catalyst layer over the entire surface of the substrate (data not shown). Furthermore, adhesion of catalyst to the substrate surface was very good.

Supported catalysts were prepared using Intalox Porcelain Saddles from Saint-Gobain NorPro Corporation. The support saddles were composed of 65 to 75% $SiO_2$ and 20 to 27% $Al_2O_3$. Prior to catalyst application, the saddles were washed in methanol, then dried at 100° C. for one hour. Aqueous nitrate solutions (~1 M) were prepared containing the catalyst precursors in the appropriate stoichiometric ratios. The saddles were placed in a perforated metal basket and repeatedly submerged in the catalyst precursor solution, followed by drying and calcining. For each application, the saddles remained in the solution for 15 minutes, then were removed and allowed to drip dry for 20 minutes. Next, the coated saddles were dried for four hours at 100° C. and calcined at 450° C. for eight hours. This process was repeated roughly nine times until the catalyst loading was 14 to 17 wt. %.

Figure 30:
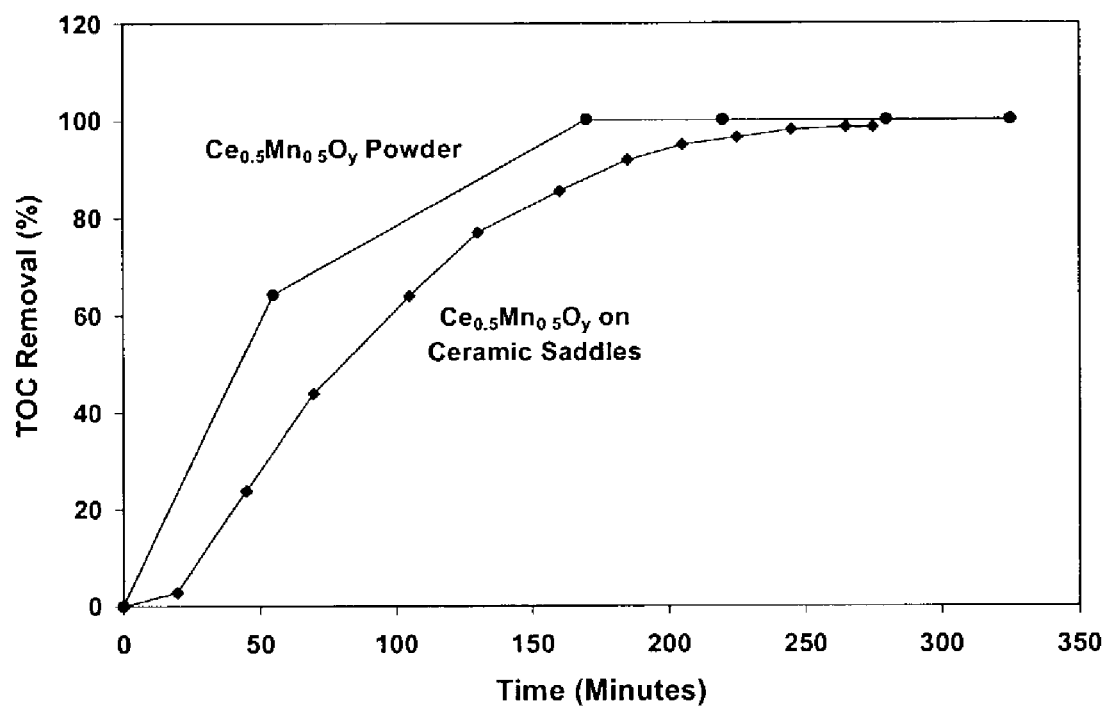
FIG. 30 compares the activity of powder and saddle-supported Ce$_{0.5}$Mn$_{0.5}$O$_{2-\delta}$.

Evaluation results for both powder and supported $Ce_{0.5}Mn_{0.5}O_y$ are presented in FIG. 30. The quantity of catalyst was approximately 3 g for each test, and the ratio of catalyst to test solution was constant. The test solution, temperature and pressure were the same as for FIG. 26. A steady flow of oxygen was supplied to the reactor during testing. Equivalent quantities of catalyst and solution were used for each test. The activity of the catalyst saddles was very high, although lower than the powder sample. This disparity in activity likely was the result of a higher dispersion of catalyst powder throughout the water sample relative to the catalyst saddles, which remain fairly grouped and stationary within the reactor. Using powder samples, stirring of the test solution results in thorough mixing and high contact efficiency between the catalyst and contaminant. Conversely, the apparent activity of the relatively stationary catalytic saddles likely are more limited by diffusion of contaminants to the catalyst active sites. After completion of the test, the catalytic saddles appeared unchanged and no free catalyst was apparent in the solution.

Figure 31:
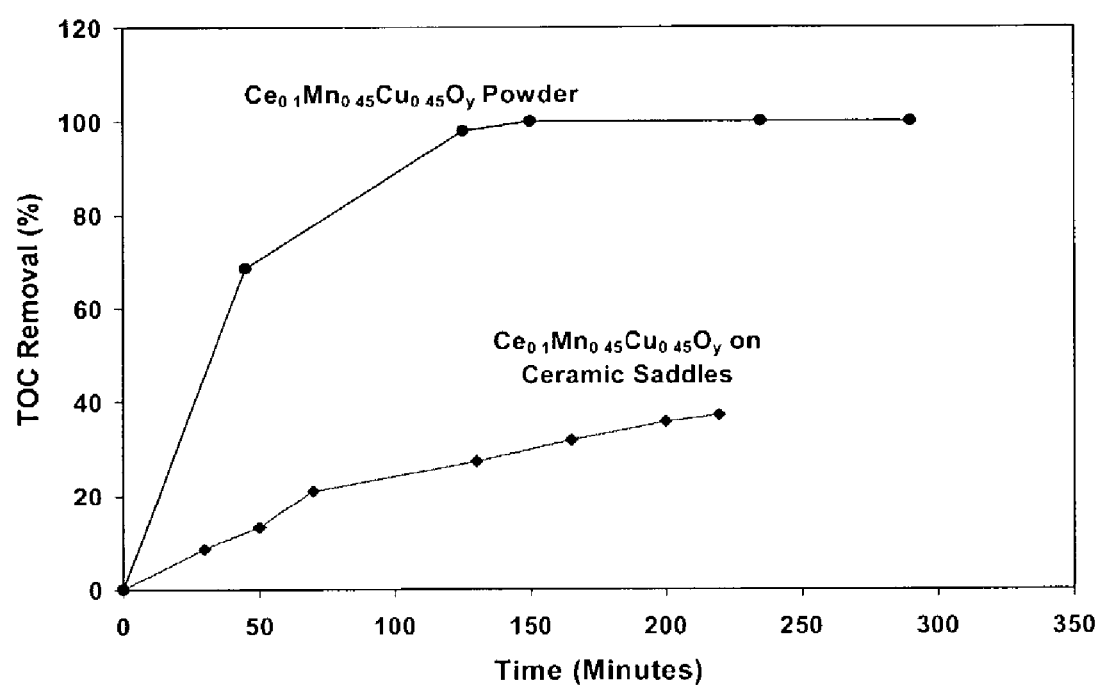
FIG. 31 compares the activity of powder and saddle-supported Ce$_{0.1}$Mn$_{0.45}$Zr$_{0.05}$Cu$_{0.05}$O$_{2-\delta}$.

FIG. 31 shows similar results for $Ce_{0.1}Mn_{0.45}Cu_{0.45}O_y$; however, in this case the catalytic saddles were much less active than the powder. The test conditions are the same as described for FIG. 30. After 50 minutes of testing, the catalytic saddles achieved only 13% TOC removal compared to almost 75% for the powder sample. For this catalyst, it is likely that the difference in activity between the two samples was the result of differences in the actual composition. The Cu-containing catalysts prepared by coprecipitation (powder samples) usually have much less Cu content than the target composition due to retention Cu cations by the Nu40H precipitating agent. However, the deposition method used for catalytic saddles does not suffer from this limitation. Therefore, it is likely that the catalytic saddles contain much more Cu than the powder, and this excess Cu is detrimental to activity.

D. Catalyst Lifetime and Stability

Figure 26:
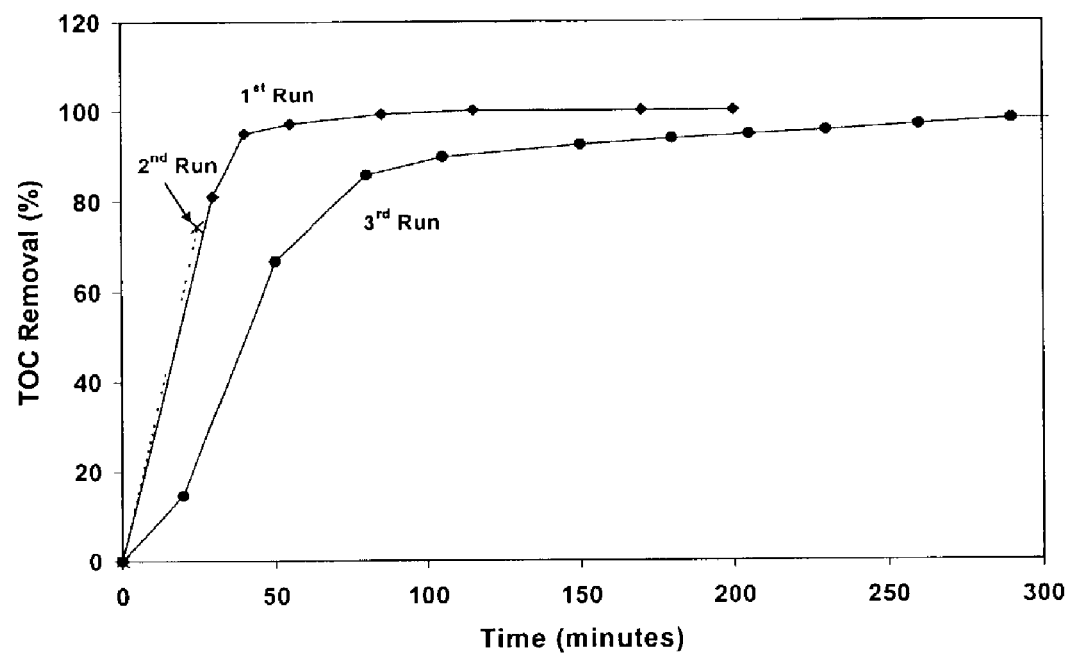
FIG. 26 shows TOC removal over time for several cycles of 3 wt. % Pt/Ce$_{0.95}$Cu$_{0.05}$O$_{2-\delta}$.

Catalyst Cycling. Selected catalysts were filtered from their original test solutions, dried, and retested under identical conditions to provide study catalyst lifetime. Results for 3 wt. % Pt/$Ce_{0.95}Cu_{0.05}O_y$ are shown in FIG. 26. In the experiments described in FIG. 26, the test solution, temperature and pressure were the same as in FIG. 25. A steady flow of oxygen was supplied to the reactor during testing. After the first run, the catalyst was dried and reconditioned at 300° C. (the same temperature used during Pt catalyst preparation) in air for eight hours, then retested. Only two data points were collected for the second run; however, the data overlapped very well with the results from the first run. After approximately four hours of testing, the catalyst again was filtered, dried, and heated at 300° C. for four hours, then retested. As evident in the figure, results from the third run were somewhat lower than the previous two. After 50 minutes of testing, the third run demonstrated 67% TOC removal compared to nearly complete removal for the first run.

Figure 27:
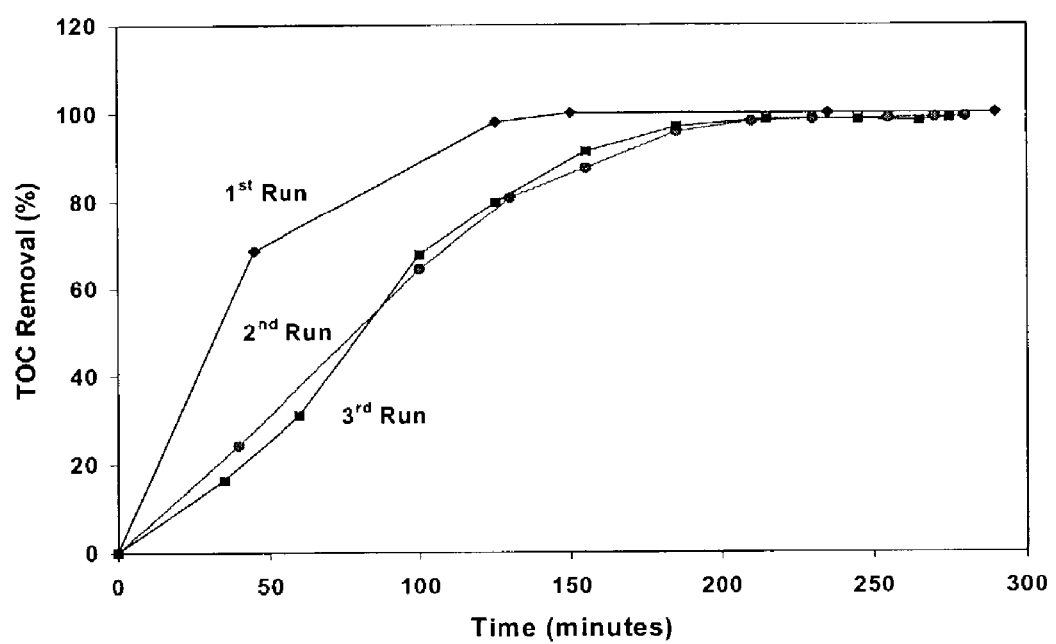
FIG. 27 shows TOC removal over time for several cycles of Ce$_{0.1}$Mn$_{0.45}$Cu$_{0.45}$O$_{2-\delta}$.

FIG. 27 contains similar results for $Ce_{0.1}Mn_{0.45}Cu_{0.45}O_y$. After the first run, the catalyst was filtered, then heated at only 100° C. prior to retesting. The other conditions were the same as for the experiments described in FIG. 26. Unlike above, catalyst activity during the second run was significantly lower, achieving only ~30% TOC removal after 50 minutes of testing compared to 68% during the first run. It was suspected that the loss in activity might be due to the lower reconditioning temperature relative to the Pt analog above. Accordingly, the catalyst was filtered, dried, and heated at 450° C. (the calcination temperature used during catalyst preparation), then retested. As shown in FIG. 27, the data for the third run were almost identical to the second run.

Catalyst Leaching. Atomic absorbance spectrophotometry (AAS) analysis was performed on water samples after catalysts evaluation to determine the extent of catalyst leaching into the solution. The results are summarized in Table 3 for some of the catalysts. Prior to AAS analysis, the samples were filtered to remove remaining catalyst, and the pH was determined to be approximately 6. Since each of the catalysts contained high levels of Mn, leaching of Mn was used as the primary indicator of catalyst stability. Presumably, Mn leaching indicates leaching of other cations and overall catalyst breakdown. This presumption is supported by the second and third entries in Table 3, which demonstrate Cu and Co levels in the test solution comparable to Mn.

The Fe-containing catalyst, $Ce_{0.1}Mn_{0.45}Fe_{0.45}O_y$, was by far the least stable material under the test conditions. After several hours in oxygenated water at 200° C. and 300 psi, more than 9 mg/L of Mn leached from the catalyst into the water sample. The catalyst $Ce_{0.5}Mn_{0.5}O_y$ demonstrated the second most leaching with nearly 2 mg/L of Mn in the water sample after catalyst evaluation. The total sample volume at the beginning of the catalyst evaluation was 0.3 L, which means that less than 0.6 mg of Mn was dissolved and less than 3 mg of catalyst was dissolved from a starting catalyst weight of 3000 mg. These values corresponded to only 0.1% of catalyst leaching into the water sample, and were a worst-case scenario relative to the other catalysts in the table (excluding the Fe-containing sample). The remaining catalysts all demonstrated less than 1 mg/L leaching of Mn.

Hydrothermal Sintering and Structural Changes. To determine the effect of CWAO operating conditions on the physical qualities of the catalysts, surface area measurements and XRD patterns were obtained on selected catalysts before and after testing. Table 4 presents the surface area data for three metal oxide catalysts. Two batches of $Ce_{0.5}Mn_{0.5}O_y$ were evaluated, and the surface areas prior to testing reflect some irreproducibility in catalyst preparation. The surface area for each batch actually increased after testing; however, Batch A only increased by ~10%, whereas, Batch B increased by ~33%. In contrast, the catalyst $Ce_{0.1}Mn_{0.45}Cu_{0.45}O_y$ experienced a dramatic reduction in surface area from 153 m²/g before testing to only 86 m²/g after testing. It is possible that this extreme reduction in surface area was due to the fact that this catalyst actually was tested three times, and was maintained for roughly 12 hours at 200° C. and 300 psi. The last catalyst in Table 4, $Ce_{0.45}Zr_{0.05}Mn_{0.45}Cu_{0.05}O_y$, also demonstrated a reduction in surface area after testing, although much less severe. Such decreases in surface area under elevated temperature and pressure were expected, and this problem should be minimized through the use of appropriate support materials.

TABLE 3

AAS results demonstrating the extent of catalyst leaching into water samples during catalyst evaluation. The test solution was 1000 mg/L acetic acid in water at 200° C. and 300 psi. A steady flow of oxygen was maintained through the reactor during each test. The error in the measurements represents ± 1σ.

| Catalyst | Mn (mg/L) | Co (mg/L) | Cu (mg/L) |
| --- | --- | --- | --- |
| $Ce_{0.5}Mn_{0.5}O_y$ | 1.7698 ± 0.0006 | — | — |
| $Ce_{0.1}Mn_{0.45}Co_{0.45}O_y$ | 0.1471 ± 0.0008 | 1.101 ± 0.003 | — |
| $Ce_{0.1}Mn_{0.45}Cu_{0.45}O_y$ | 0.1668 ± 0.0008 | — | 0.083 ± 0.001 |
| $Ce_{0.1}Mn_{0.45}Fe_{0.45}O_y$ | 9.471 ± 0.002 | — | — |
| $Ce_{0.475}Zr_{0.05}Mn_{0.475}O_y$ | 0.307 ± 0.001 | — | — |
| $Ce_{0.45}Zr_{0.05}Mn_{0.45}Cu_{0.05}O_y$ | 0.599 ± 0.001 | — | — |
| $Ce_{0.4}Zr_{0.05}Mn_{0.4}Cu_{0.15}O_y$ | 0.988 ± 0.002 | — | — |

Figure 28:
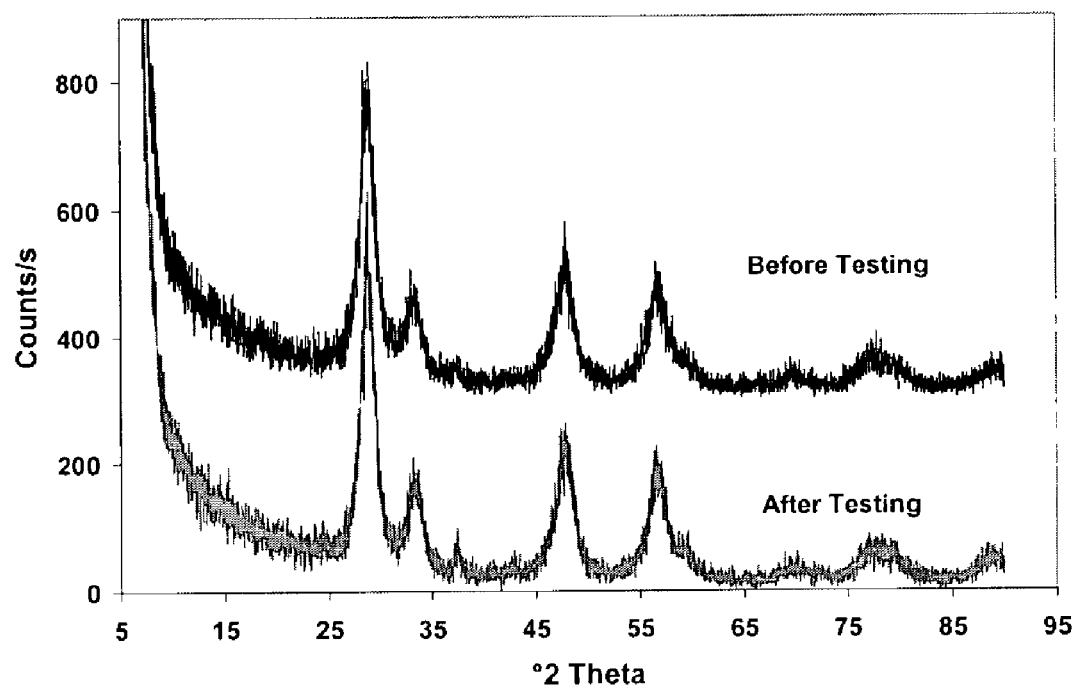
FIG. 28 shows XRD patterns for Ce$_{0.5}$Mn$_{0.5}$O$_{2-\delta}$ before and after catalyst evaluation.
Figure 29:
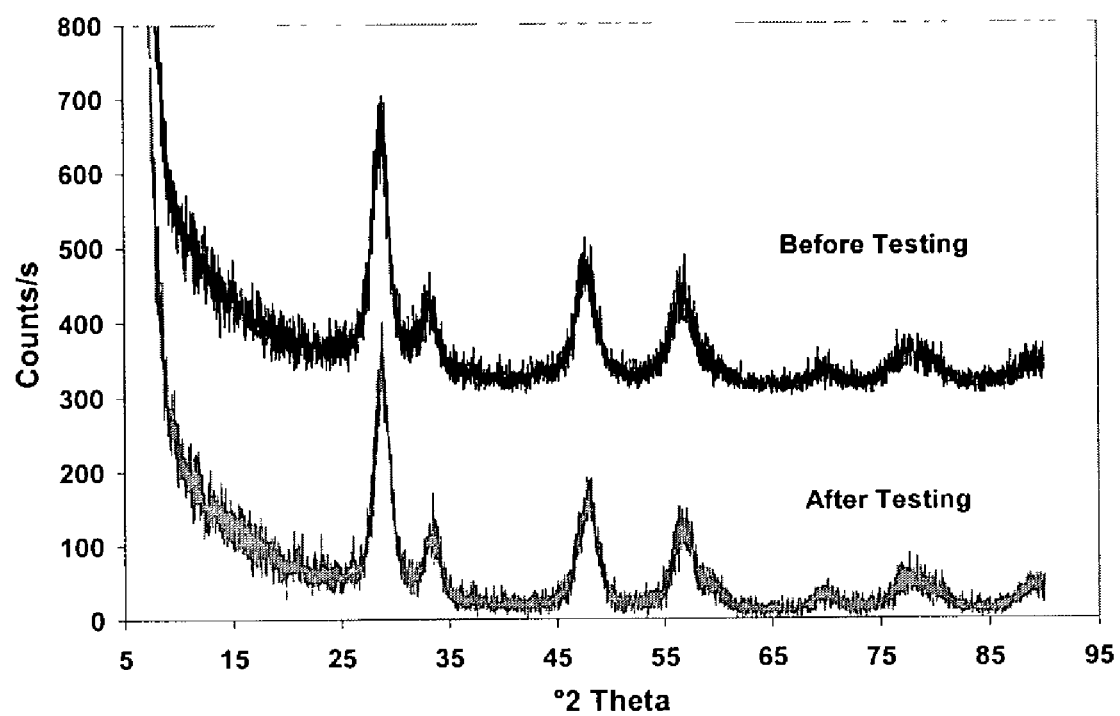
FIG. 29 shows XRD patterns for Ce$_{0.45}$Zr$_{0.05}$Mn$_{0.45}$Cu$_{0.05}$O$_{2-\delta}$ before and after catalyst evaluation.

FIGS. 28 and 29 show the XRD patterns for $Ce_{0.5}Mn_{0.5}O_y$ and $Ce_{0.45}Zr_{0.05}Mn_{0.45}Cu_{0.05}O_y$, respectively, before and after testing. The test solution, temperature and pressure were the same as shown for FIG. 26. A steady flow of oxygen was supplied to the reactor during testing. The diffraction patterns were characteristic of the $CeO_2$ fluorite structure, and no significant differences were apparent between the samples, although FIG. 28 does show a small unidentified peak at ~38°. Catalyst crystallite sizes and lattice parameters were calculated from the XRD data and are summarized in Table 5. Within error, there were no changes in these samples during testing.

TABLE 4

Summary of powder catalyst surface areas before and after catalyst evaluation. The test solution was 1000 mg/L acetic acid in water at 200° C. and 300 psi. A steady flow of oxygen was maintained through the reactor during each test. The error in the measurements represents ± 1σ.

| Catalyst | Surface Area Before Evaluation ($m^2/g$) | Surface Area After Evaluation ($m^2/g$) |
|---|---|---|
| $Ce_{0.5}Mn_{0.5}O_y$ (batch A) | 57.7 ± 0.2 | 63.9 ± 0.2 |
| $Ce_{0.5}Mn_{0.5}O_y$ (batch B) | 71.8 ± 0.5 | 95.2 ± 0.5 |
| $Ce_{0.1}Mn_{0.45}Cu_{0.45}O_y$ | 153 ± 2 | 86.5 ± 0.5 |
| $Ce_{0.45}Zr_{0.05}Mn_{0.45}Cu_{0.05}O_y$ | 130.6 ± 0.9 | 121.7 ± 0.7 |

TABLE 5

Comparison of catalyst powder crystallite size and lattice parameter before and after testing. The test solution was 1000 mg/L acetic acid in water at 200° C. and 300 psi. A steady flow of oxygen was maintained through the reactor during each test. The error in the measurements represents ± 1σ.

| Catalyst | Crystallite Size (Å) Before | Crystallite Size (Å) After | Lattice Parameter (Å) Before | Lattice Parameter (Å) After |
|---|---|---|---|---|
| $Ce_{0.5}Mn_{0.5}O_y$ | 55 | 53 | 5.41 ± 0.02 | 5.43 ± 0.01 |
| $Ce_{0.45}Zr_{0.05}Mn_{0.45}Cu_{0.05}O_y$ | 49 | 48 | 5.44 ± 0.01 | 5.43 ± 0.01 |

Other catalysts that have been prepared and are useful in the methods and compositions of the invention are listed in Table 6.

TABLE 6

Support and Catalyst B.E.T. Surface Area Measurements

| Support Material | Pt or Pd Metal Loading | Surface Area ($m^2/g$) |
|---|---|---|
| $CeO_2$ | none | 24 |
| | 1% Pt | 33 |
| | 5% Pt | 36 |
| | 10% Pt | 35 |
| | 5% Pd | 66 |
| $ZrO_2$ | none | 125 |
| | 5% P | 74 |
| 25% $CeO_2/ZrO_2$ | none | 86 |
| 12% $CeO_2/ZrO_2$ | 1% Pt | 112 |
| $Ce_{0.8}Zr_{0.2}O_{2-\delta}$ | none | 107 |
| | 5% Pt | 101 |
| $CeCo_{0.5}Cu_{0.5}O_{2-\delta}$(co-ppt) | none | 98 |
| | 5% Pt | 97 |
| $CeCo_{0.5}Cu_{0.5}O_{2-\delta}$(oxides) | none | 0.7 |
| $Ce_{0.9}Cu_{0.1}O_{2-\delta}$ | none | 89 |
| $Ce_{0.5}Cu_{0.5}O_{2-\delta}$ | none | 170 |
| $Ce_{0.9}Sr_{0.1}O_{2-\delta}$ | none | 66 |
| $Ce_{0.5}Sr_{0.5}O_{2-\delta}$ | none | 48 |
| $Ce_{0.8}Gd_{0.2}O_{2-\delta}$ | none | 80 |
| $Ce_{0.8}Fe_{0.2}O_{2-\delta}$ | none | 95 |
| $Ce_{0.8}Co_{0.2}O_{2-\delta}$ | none | 135 |
| 10% $CeO_2/CuO$ | none | 8 |
| 10% $CuO/CeO_2$ | none | 11 |
| 10% $CuO/CeO_2$ | none | 12 |
| 10% $CuO/CeO_2$ (higher surface area ceria) | none | 41 |
| 10% $CuO/CeO_2$ (higher surface area ceria) | none | 41 |
| $Ce_{0.9}Cu_{0.1}O_{1.9}$ | none | 85 |
| $Ce_{0.8}Cu_{0.2}O_{1.8}$ | none | 120 |
| $Ce_{0.7}Cu_{0.3}O_{1.7}$ | none | 125 |
| $Ce_{0.6}Cu_{0.4}O_{1.6}$ | none | 179 |
| $Ce_{0.5}Cu_{0.5}O_{1.5}$ | none | 172 |
| $Ce_{0.8}Cu_{0.2}O_{1.8}$ | none | 100 |
| $Ce_{0.6}Cu_{0.4}O_{1.6}$ | none | 119 |
| 10% $CeO_2/MnO_2$ | none | 12 |
| 10% $MnO_2/CeO_2$ | none | 12 |
| 10% $MnO_2/CeO_2$ | none | 12 |
| 10% $MnO_2/CeO_2$ (higher surface area ceria) | none | 36 |
| 10% $MnO_2/CeO_2$ (higher surface area ceria) | none | 32 |
| 10% $CeO_2/Fe_2O_3$ | none | 11 |
| 10% $Fe_2O_3/CeO_2$ | none | 19 |
| 10% $Fe_2O_3/CeO_2$ | none | 23 |
| 10% $CeO_2/Co_3O_4$ | none | 9 |
| 10% $Co_3O_4/CeO_2$ | none | 15 |
| 10% $Co_3O_4/CeO_2$ | none | 16 |
| 10% $ZrO_2/CeO_2$ | none | 18 |
| 10% $ZrO_2/CeO_2$ | none | 26 |
| 10% $ZrO_2/10\% CuO/CeO_2$ | none | 27 |
| 10% $ZrO_2/10\% MnO_2/CeO_2$ | none | 36 |
| 10% $ZrO_2/10\% Fe_2O_3/CeO_2$ | none | 35 |
| 10% $ZrO_2/10\% Co_3O_4/CeO_2$ | none | 33 |
| $Ce_{0.95}Gd_{0.05}O_{1.98}$ | none | 78 |
| $Ce_{0.8}Gd_{0.2}O_{1.9}$ | none | 73 |
| $Ce_{0.5}Gd_{0.5}O_{1.5}$ | none | 29 |
| $Ce_{0.95}Sr_{0.05}O_{1.95}$ | none | 77 |
| $Ce_{0.8}Sr_{0.2}O_{1.8}$ | none | 50 |
| $Ce_{0.95}Co_{0.05}O_{1.95}$ | none | 85 |
| $Ce_{0.8}Co_{0.2}O_{1.8}$ | none | 112 |
| $Ce_{0.5}Co_{0.5}O_{1.5}$ | none | 95 |
| $Ce_{0.95}Mn_{0.05}O_{1.95}$ | none | 102 |
| $Ce_{0.8}Mn_{0.2}O_{1.8}$ | none | 111 |
| $Ce_{0.5}Mn_{0.5}O_{1.5}$ | none | 120 |
| $Ce_{0.95}Zr_{0.05}O_{1.95}$ | none | 114 |
| $Ce_{0.8}Zr_{0.2}O_{1.8}$ | none | 64 |
| $Ce_{0.5}Zr_{0.5}O_{1.5}$ | none | 68 |
| $Ce_{0.75}Zr_{0.2}Cu_{0.05}O_{1.95}$ | none | 28 |
| $CeO_2$ | none | 44 |
| $CuO$ | none | 5 |
| $Co_3O_4$ | none | 35 |
| $MnO_2(Mn_2O_3)$ | none | 16 |
| $CeCo_{0.5}Cu_{0.5}O_{2-\delta}$ | none | 103 |
| $CeMn_{0.5}Cu_{0.5}O_{2-\delta}$ | none | 109 |
| $CeFe_{0.5}Cu_{0.5}O_{2-\delta}$ | none | 144 |
| $Ce_{0.5}Co_{0.1}Cu_{0.4}O_{2-\delta}$ | none | 139 |
| $Ce_{0.5}Mn_{0.1}Cu_{0.4}O_{2-\delta}$ | none | 188 |
| $Ce_{0.5}Fe_{0.1}Cu_{0.4}O_{2-\delta}$ | none | 170 |
| $Ce_{0.95}La_{0.05}O_{2-\delta}$ | none | 87 |
| $Ce_{0.45}La_{0.05}Mn_{0.25}Cu_{0.25}O_{2-\delta}$ | none | 209 |
| $Mn_{0.95}Ce_{0.05}O_{2-\delta}$ | none | 25 |
| $Ce_{0.8}Zr_{0.05}Mn_{0.15}O_{2-\delta}$ | none | 94 |
| $Ce_{0.9}Zr_{0.05}Mn_{0.05}O_{2-\delta}$ | none | 87 |
| $Ce_{0.8}Zr_{0.05}Mn_{0.1}Cu_{0.05}O_{2-\delta}$ | none | 106 |
| $Ce_{0.45}Zr_{0.05}Mn_{0.45}Cu_{0.05}O_{2-\delta}$ | none | 76 |
| $Ce_{0.9}Zr_{0.025}Mn_{0.05}Cu_{0.025}O_{2-\delta}$ | none | 88 |
| $Cr_2O_3$ | none | 2 |
| $Ce_{0.8}Zr_{0.05}Cu_{0.15}O_{2-\delta}$ | none | 64 |
| $Ce_{0.48}Zr_{0.05}Cu_{0.48}O_{2-\delta}$ | none | 114 |

E. Incorporation of Catalysts onto Supports

A class of catalysts of the invention are those that do not require an inert support, such as alumina or carbon. For certain applications, such as industrial-scale processing or treatment of liquid media, it is desired to support the catalyst. It is preferable if the support maintains some structural strength under the temperature and pressure conditions used in the process, so that the support does not crumble or otherwise make it difficult to retrieve from the liquid media. One class of catalysts and catalyst compositions of the invention include a support material such as ceramic or hydrophobic support. These supports can take many shapes, such as a monolith, pellet, ring, disk or saddle, as known in the art. Ceramic supports include silica, alumina, Cordierite and others, as known in the art. Support structures are known in the art. Preferably, the support material is fabricated from ceramic materials, but may also be fabricated from metals or ceramic or metal fibers. The support material is preferably hydrophobic to promote partitioning of the organic to active sites. The catalyst may be deposited onto a pre-formed support, or pellets or other shapes may be made out of the catalyst, as known in the art.

The catalysts of this invention are suitable for use in any reactor system and can be prepared as powders or pressed into plugs, pellets and other shapes suitable for use in a given reactor configuration. Ceramic monoliths contain narrow channels running parallel to the length of the tube. Coating the interior walls of the monolith with catalyst provides a compromise between high aqueous solution-catalyst contact and high flow rates. The goal for supporting the catalysts is to produce an evenly-distributed high-surface area catalyst coating without plugging the pores of the support. As with the catalyst powders discussed above, several techniques for incorporating the catalysts with the supports, and for pre-activating the supported catalysts may be used. Overall, activity per gram of catalyst will determine the optimum supported configuration.

a. Monolith Supports

Ceramic Cordierite monoliths are obtained from commercial sources (Coming) with a cell density of 400/in$^2$. Coating of the ceramic monoliths with catalyst may be performed by four methods, 1) dip-coating the monolith in a slurry of the catalyst in a solvent, 2) decomposition of metal precursors onto the monolith, 3) precipitation-deposition of catalyst onto the monolith, and 4) wash-coating the monolith with nano-scale dispersions of catalysts. The objective is to form an evenly-distributed catalyst layer on the inside of the monolith cell, without creating a prohibitive pressure drop. More detailed morphological and compositional information may be obtained using SEM and EDX. The catalyst loading is determined by weighing the monolith sections before and after deposition.

Slurry Coating. For slurry coating, the catalyst powder is mixed with a solvent with sufficient viscosity to maintain suspension of the catalyst particles, while allowing thorough coating of the monolith surface. The slurry is added dropwise to one end of the monolith and allowed to flow through the monolith lengthwise. Between additions, the slurry-coated monolith is dried in air, for example at 120° C. for several hours. After drying, the coated monolith is calcined in air at 300° C., for example, for several hours.

Decomposition of the Nitrate Precursors. For this method, a section of the monolith is completely submerged for 15 seconds in a ~0.5 M solution of $Ce(NO_3)_3$, then dried in air at 120° C. for several hours. This process is repeated until a 50 wt. % loading of $Ce(NO_3)_3$ relative to the weight of the monolith is achieved. The coated monolith is then calcined in air at 1000° C. for 3 hours resulting in a very stable 23 wt. % loading of $CeO_2$. Next, one end of the coated monolith is dipped into 1 mL of a 10- mg/mL Pt solution causing the solution to wick into the monolith. The monolith is dried at 100° C., then reduced under $H_2$ at 3000° C. for 3 hours, resulting in a Pt loading of 1% relative to the weight of $CeO_2$.

Precipitation-Deposition. This method combines the metal precursor-decomposition technique above, with the coprecipitation technique described above. Specifically, the monolith is submerged in a 1 M solution of the appropriate metal precursors in the necessary stoichiometric ratio. Next, a precipitating reagent is added to produce the metal hydroxides. Decomposition at elevated temperatures in air generates a metal oxide coating on the monolith surface. As with the above method, the catalyst metal can be incorporated with the original precursor solution, or added in a second step. Adding the metal in a second step should reduce the amount enveloped by the metal oxide layer, and lead to higher activity at lower metal loading This method should yield surface structure and particle size characteristics similar to the coprecipitated powders.

Wash Coating. The wash coating technique described above may also be used to coat the ceramic monolith.

b. Ceramic Forms

Catalyst forms can be prepared either by pressing the catalyst material into a ceramic body of the desired shape, or by coating the outside of pre-pressed forms with catalyst. The former type will have greater structural integrity; however most of the catalyst material is incorporated on the inside of the form and is not contributing to the activity. The later configuration will be more susceptible to degradation from loss of catalyst from the surface; however, much less catalyst is required, which is more desirable for catalysts containing precious metals. Two types of pellet configurations have been investigated, although others are possible. For the first type of pellet configuration, inert pellets of alumina and silica with approximately 6-mm particle diameters are obtained from commercial sources and coated with catalyst for use as large-grain structural supports. Smaller grain pellets are prepared by crushing and sieving the 6-mm diameter pellets to 4- and 2-mm diameters. The method of incorporation of the catalyst onto the pellets likely is critical to the resulting activity, stability, and pressure drops observed for the system. Therefore, the exact same methods described for coating the monolith supports will be compared for coating pellets. As with the monoliths, the objective is to obtain a well-distributed, reproducible layer of catalyst on the pellet surface. The resulting catalyst-coated pellets are loosely packed in a quartz tube to form a structure similar to the coated monolith. The size of the pellets is an important variable to overall performance. Pellets that are to large will lead to bypassing and channeling of the stream; whereas pellets that are too small might lead to impractical pressure drops in the reactor.

The second type of pellet configuration involves preparing pellets from the active powder supports, then depositing the catalytic precious metal(s) on the exterior of the pellet. The pellets are formed by mixing approximately 1 g of powder support with 1 to 3 wt.-% of a ceramic binder (e.g. methylcellulose) and drying in an oven. The resulting powder is introduced into a pellet press and pressed at 25,000 to 60,000 psi for 1 to 5 minutes. The green pellets of each material are sintered in a bed of the same material in alumina or zirconia crucibles. Sintering temperatures of 1200° C. to 1900° C. are used to achieve greater than 90% of the theoretical density, as determined from unit cell volumes calculated from the XRD patterns. Once the pellets are centered, they are ground to the desired size range, and immersed into a solution of the catalytic metal precursor, followed by drying and heating under a flow of $H_2$ at 300° C. for 3 hours. The high sintering temperatures are used to achieve high material densities, which is desirable to minimize the amount of metal precursor that wicks into the support. However, is should be pointed out that the high temperatures required for sintering is not compatible with many of the doped $CeO_2$ materials due to insolubility of the phases.

c. Catalyst Clusters

Catalyst clusters are prepared by spreading out a layer of active support in a Pyrex dish, and spraying a fine mist of catalytic metal precursor over the powder using an air brush paint sprayer. Mechanical agitation of the dish during the spraying process results in clustering of the catalyst. The degree of metal loading in the clusters is controlled by varying the concentration and amount of precursor solution applied to the powder. The resulting clusters are oven dried, and sintered to produce structural rigidity. Then, the catalytic metal is reduced under a flow of $H_2$ at 300° C. for 3 hours. The exact sintering conditions are determined experimentally and do not involve undue experimentation. Again, if high temperatures are required to attain acceptable integrity, this method might not be compatible with the doped $CeO_2$ materials.

Other catalysts and structural supports may be used to optimize the organic compound destruction using the methods described herein, or by modification of the methods described herein, or the methods well known to the art.

Although the description above contains many specificities, these should not be construed as limiting the scope of the invention but as merely providing illustrations of some of the presently-preferred embodiments of the invention. For example, other methods of preparing catalysts may be used. Different conditions may be used for destruction of an organic compound from liquid media, and no undue experimentation is required for the determination of useful treatment conditions. Also, different catalysts may be used in the methods and compositions of the invention. Thus, the scope of the invention should be determined by the appended claims and their legal equivalents, rather than by the examples given. All references cited herein are hereby incorporated by reference to the extent not inconsistent with the disclosure herein.

REFERENCES

Chuang, T. Karl, et al., Ind. Eng. Chem. Res., 1994, 33, 1680-1686.
Chuang, T. Karl, et al., Ind. Eng. Chem. Res., 1992, 31, 2466-2472.
Rangwala, H. A., et al., Canadian Journal of Chemical Engineering, April 1994, 72.
Sharma, Ramesh K., et al., Ind. Eng. Chem. Res. 1995, 34, 4310-4317.
Wu, Jeffrey Chi-Sheng, et al., Catalysts Today, 1998, 44, 111-118.
Zhang, Mingqian, et al., Applied Catalysts B: Environmental 13, 1997, 123-130.

I claim:

1. A method of destroying an organic compound in liquid media comprising:
   contacting said liquid media with a catalyst of formula:

$nN/Ce_{1-x}Zr_cB_bB'_{b'}O_{2-\delta}$ wherein n is a percentage from 0 to 25; N is one or more metals selected from the group consisting of Pt, Pd, Rh, Ru, Re, Os and Ir; x=b+b'+c; b, and b' are each, independently of one another, between 0 to 0.99 and both of b and b' are nonzero; x≤0.7; B is Mn, and B' is Co, or Cu; c is between 0 and 0.2 and c is nonzero, δ is a number which renders the catalyst charge neutral; at a temperature and pressure sufficient to destroy said organic compound.

2. The method of claim 1, wherein n is nonzero and N is selected from the group consisting of: Pt, Pd and Ru.

3. The method of claim 1, wherein the catalyst comprises cerium, zirconium, manganese and Cu; and when n is nonzero N is one or more members of the group selected from Pt, Pd and Ru.

4. The method of claim 1, wherein the liquid media is wastewater.

5. The method of claim 1 wherein the catalyst further comprises a support.

6. The method of claim 5, wherein the catalyst support is hydrophobic.

7. The method of claim 1 wherein the catalyst is prepared by coprecipitation.

8. The method of claim 1 wherein the temperature is 200° C. or less.

9. A method of destroying an organic compound in liquid media comprising:
   contacting said liquid media with a catalyst, selected from the group consisting of:
   $Ce_{0.475}Zr_{0.05}Mn_{0.475}Oy$; $Ce_{0.48}Zr_{0.05}Mn_{0.48}O_y$,
   $Ce_{0.1}Mn_{0.45}Co_{0.45}O_y$;
   $Ce_{0.4}Zr_{0.05}Mn_{0.4}Cu_{0.15}O_y$; and
   $Ce_{0.45}Zr_{0.05}Mn_{0.45}Cu_{0.05}O_y$;
   wherein y is a number that renders the compound charge neutral, at a temperature and pressure sufficient to destroy said organic compound.

10. The method of claim 9 wherein the catalyst is $Ce_{0.1}Mn_{0.45}Co_{0.45}O_y$.

11. The method of claim 10 wherein the catalyst is prepared by coprecipitation.

12. The method of claim 9 wherein the catalyst is prepared by coprecipitation.

13. A method of destroying an organic compound in liquid media comprising: contacting said liquid media with a catalyst, selected from the group consisting of:
   $nN/Ce_{0.475}Zr_{0.05}Mn_{0.475}Oy$; $nN/Ce_{0.48}Zr_{0.05}Mn_{0.48}O_y$;
   $nN/Ce_{0.1}Mn_{0.45}Co_{0.45}O_y$;
   $nN/Ce_{0.4}Zr_{0.05}Mn_{0.4}Cu_{0.15}O_y$; and
   $nN/Ce_{0.45}Zr_{0.05}Mn_{0.45}Cu_{0.05}O_y$;
   wherein n is 0 to 5%, N is Pt or Ru and y is a number that renders the compound charge neutral, at a temperature and pressure sufficient to destroy said organic compound.

14. The method of claim 13 wherein the catalyst further comprises a support.

15. The method of claim 14 wherein the support is hydrophobic.

16. The method of claim 14 wherein the catalyst is prepared by coprecipitation.

17. The method of claim 13 wherein the temperature 200° C. or less.

* * * * *

UNITED STATES PATENT AND TRADEMARK OFFICE
CERTIFICATE OF CORRECTION

PATENT NO.         : 7,329,359 B2                              Page 1 of 1
APPLICATION NO. : 10/256212
DATED              : February 12, 2008
INVENTOR(S)        : Shane E. Roark It is certified that error appears in the above-identified patent and that said Letters Patent is hereby corrected as shown below:

In claim 9, column 26, line 28, please replace "$Ce_{0.48}Zr_{0.05}Mn_{0.48}O_y$" with --$Ce_{0.48}Zr_{0.05}Mn_{0.48}O_y$;--

In claim 17, column 26, line 68, please replace "the temperature 200°C. or less." with --the temperature is 200°C or less.--

Signed and Sealed this

First Day of July, 2008

JON W. DUDAS
*Director of the United States Patent and Trademark Office*